(12) United States Patent
Li et al.

(10) Patent No.: US 10,194,471 B2
(45) Date of Patent: Jan. 29, 2019

(54) DATA TRANSMISSION METHOD, USER EQUIPMENT, AND BASE STATION

(71) Applicant: Huawei Technologies Co., Ltd., Shenzhen (CN)

(72) Inventors: Chao Li, Beijing (CN); Yajuan Li, Shenzhen (CN); Xingwei Zhang, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 15/722,824

(22) Filed: Oct. 2, 2017

(65) Prior Publication Data

US 2018/0027475 A1 Jan. 25, 2018

Related U.S. Application Data

(63) Continuation of application No. PCT/CN2015/075922, filed on Apr. 3, 2015.

(51) Int. Cl.
*H04B 7/15* (2006.01)
*H04W 76/10* (2018.01)
(Continued)

(52) U.S. Cl.
CPC ............ *H04W 76/10* (2018.02); *H04W 8/24* (2013.01); *H04W 24/02* (2013.01); *H04W 40/22* (2013.01); *H04W 88/04* (2013.01)

(58) Field of Classification Search
CPC ....... H04W 4/02; H04W 88/02; H04W 88/04; H04W 88/06; H04W 92/02; H04W 68/00; H04W 76/02; H04B 17/309; H04B 17/318
(Continued)

(56) References Cited

U.S. PATENT DOCUMENTS

2007/0249347 A1\* 10/2007 Saifullah ............... H04W 36/38
455/436
2011/0053582 A1\* 3/2011 Mueck .................. H04W 48/14
455/419
(Continued)

FOREIGN PATENT DOCUMENTS

CN 102780993 A 11/2012
CN 103634812 A 3/2014
(Continued)

OTHER PUBLICATIONS

3rd Generation Partnership Project; Technical Specification Group Services and System Aspects; Proximity-based services (ProSe); Stage 2 (Release 12), 3GPP TS 23.303 V12.4.0 (Mar. 2015), 63 pages.
(Continued)

*Primary Examiner* — Temica M Beamer
(74) *Attorney, Agent, or Firm* — Slater Matsil, LLP

(57) ABSTRACT

Embodiments of the present invention provide a data transmission method, including: receiving, by second UE, a first message sent by first UE or a base station, where the first message includes relay request information; sending, by the second UE, a second message to the base station according to the first message, where the second message includes information indicating that the second UE requests to act as relay UE for data transmission between the first UE and the base station; and receiving, by the second UE, a third message sent by the base station, where the third message instructs the second UE to act as the relay UE.

14 Claims, 16 Drawing Sheets

(51) Int. Cl.
  *H04W 8/24* (2009.01)
  *H04W 24/02* (2009.01)
  *H04W 40/22* (2009.01)
  *H04W 88/04* (2009.01)
(58) Field of Classification Search
  USPC .......... 455/426.1, 13.1, 422.1, 67.11, 226.1, 455/226.2
  See application file for complete search history.

(56) References Cited

U.S. PATENT DOCUMENTS

| | | | |
|---|---|---|---|
| 2013/0029591 A1 | 1/2013 | Park et al. | |
| 2013/0316641 A1* | 11/2013 | Aaron | H04W 72/085 455/9 |
| 2015/0029866 A1 | 1/2015 | Liao et al. | |
| 2015/0237573 A1 | 8/2015 | Li et al. | |
| 2015/0334555 A1 | 11/2015 | Seo et al. | |
| 2015/0341974 A1 | 11/2015 | Wu et al. | |
| 2016/0174130 A1* | 6/2016 | Ljung | H04W 88/04 370/315 |
| 2016/0295494 A1* | 10/2016 | Gulati | H04W 40/22 |
| 2016/0359962 A1* | 12/2016 | Serban | H04W 4/00 |
| 2016/0366600 A1* | 12/2016 | Wang | H04W 24/02 |
| 2017/0273121 A1 | 9/2017 | Tong et al. | |
| 2018/0092023 A1* | 3/2018 | Braithwaite | H04L 1/1816 |

FOREIGN PATENT DOCUMENTS

| | | |
|---|---|---|
| CN | 103701563 A | 4/2014 |
| CN | 103906266 A | 7/2014 |
| EP | 2562940 A2 | 2/2013 |
| EP | 2928257 A1 | 10/2015 |
| JP | 2001036459 A | 2/2001 |
| WO | 2011132908 A2 | 10/2011 |
| WO | 2014051126 A1 | 4/2014 |
| WO | 2014067104 A1 | 5/2014 |
| WO | 2014098446 A1 | 6/2014 |
| WO | 2014101681 A1 | 7/2014 |

OTHER PUBLICATIONS

3rd Generation Partnership Project; Technical Specification Group Radio Access Network; Evolved Universal Terrestrial Radio Access (E-UTRA); Multiplexing and channel coding (Release 12), 3GPP TS 36.212 V12.4.0 (Mar. 2015), 94 pages.

3rd Generation Partnership Project; Technical Specification Group Radio Access Network; Evolved Universal Terrestrial Radio Access (E-UTRA); Physical layer procedures (Release 12), 3GPP TS 36.213 V12.5.0 (Mar. 2015), 239 pages.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), 3GPP TS 36.300 V12.5.0 (Mar. 2015), 251 pages.

3rd Generation Partnership Project; Technical Specification Group Radio Access Network; Evolved Universal Terrestrial Radio Access (E-UTRA); Radio Resource Control (RRC); Protocol specification (Release 12), 3GPP TS 36.331 V12.5.0 (Mar. 2015), 445 pages.

Qualcomm, Inc., "Work Item Proposal for Enhanced LTE Device to Device Proximity Services", 3GPP TSG RAN Meeting #66, RP-142311, Maui, HI, USA, Dec. 8-11, 2014, 8 pages.

Huawei et al., "The ProSe UE-to-network relay with the network authorization," SA WG2 Meeting #99, S2-133843, Sep. 23-27, 2013, 4 pages.

Sony, "Considerations on ProSe Relays Selection," SA WG2 Meeting #105, S2-143134, Oct. 13-17, 2014, Sapporo, Japan, 10 pages.

SA WG2, "TR 23.703 version 2.0.0: 'Study on architecture enhancements to support Proximity-based Services (ProSe)(Release 12)' for Approval," 3GPP TSG SA Meeting #63, SP-140116, Fukuoka, Japan, Mar. 5-7, 2014, 2 pages.

* cited by examiner (a)

(b)

DATA TRANSMISSION METHOD, USER EQUIPMENT, AND BASE STATION

CROSS-REFERENCE TO RELATED APPLICATIONS

This application is a continuation of International Application No. PCT/CN2015/075922, filed on Apr. 3, 2015, the disclosure of which is hereby incorporated by reference in its entirety.

TECHNICAL FIELD

Embodiments of the present invention relate to the communications field, and more specifically, to a data transmission method, user equipment, and a base station.

BACKGROUND

A base station can perform, by using a cellular link, data communication with user equipment (UE) located in a cell of the base station. As shown in FIG. 1, UE 30 is located in a cell 40 of a base station 10, and then uplink and downlink data is transmitted between the base station 10 and the UE 30 by using a cellular link.

However, because UE 20 is located in a cell 60 of a base station 50, data communication cannot be directly performed between the base station 10 and the UE 20. Instead, the data transmission between the base station 10 and the UE 20 needs to be performed via the base station 50. For example, if the UE 20 needs to send uplink data to the base station 10, the UE 20 first needs to send the uplink data to the base station 50 by using a cellular link, and then the base station 50 forwards the uplink data to the base station 10. For example, if the base station 10 needs to send downlink data to the UE 20, the base station 10 first needs to send the downlink data to the base station 50, and then the base station 50 forwards the downlink data to the UE 20 by using a cellular link.

In this way, not only cellular link congestion is caused, but also a delay of data transmission is long. Consequently, data transmission efficiency is low.

SUMMARY

Embodiments of the present invention provide a data transmission method, to ensure data transmission efficiency.

According to a first aspect, a data transmission method is provided. The method includes receiving, by second user equipment UE, a first message sent by first UE or a base station, where the first message includes relay request information. The method also includes sending, by the second UE, a second message to the base station according to the first message, where the second message includes information indicating that the second UE requests to act as relay UE for data transmission between the first UE and the base station. The method also includes receiving, by the second UE, a third message sent by the base station, where the third message instructs the second UE to act as the relay UE.

According to a second aspect, a data transmission method is provided. The method includes receiving, by a base station, a first message, where the first message includes information requesting to allocate relay UE for data transmission between first UE and the base station. The method also includes sending, by the base station, a second message to second UE, where the second message indicates that the second UE acts as the relay UE.

According to a third aspect, a data transmission method is provided. The method includes sending, by a base station, a first message to at least one user equipment UE, where the first message includes relay request information for data transmission between the base station and first UE. The method also includes receiving, by the base station, a second message sent by each of some or all UEs of the at least one UE, where the second message is a response message to the first message, and the some or all UEs include second UE. The method also includes sending, by the base station, a third message to the second UE, where the third message instructs the second UE to act as relay UE for data transmission between the base station and the first UE.

According to a fourth aspect, user equipment is provided, where the user equipment is second user equipment UE. The UE includes a receiving unit, configured to receive a first message sent by first UE or a base station, where the first message includes relay request information. The UE also includes a sending unit, configured to send a second message to the base station according to the first message received by the receiving unit, where the second message includes information indicating that the second UE requests to act as relay UE for data transmission between the first UE and the base station. The receiving unit is further configured to receive a third message sent by the base station, where the third message instructs the second UE to act as the relay UE.

According to a fifth aspect, a base station is provided. The base station includes a receiving unit, configured to receive a first message, where the first message includes information requesting to allocate relay UE for data transmission between first UE and the base station. The base station also includes a sending unit, configured to send a second message to second UE, where the second message indicates that the second UE acts as the relay UE.

According to a sixth aspect, a base station is provided. The base station also includes a sending unit, configured to send a first message to at least one user equipment UE, where the first message includes relay request information for data transmission between the base station and first UE. The base station also includes a receiving unit, configured to receive a second message sent by each of some or all UEs of the at least one UE, where the second message is a response message to the first message, and the some or all UEs include second UE. The sending unit is further configured to send a third message to the second UE, where the third message instructs the second UE to act as relay UE for data transmission between the base station and the first UE.

According to a seventh aspect, user equipment is provided, where the user equipment is second user equipment UE. The UE includes a receiver, configured to receive a first message sent by first UE or a base station, where the first message includes relay request information. The UE also includes a transmitter, configured to send a second message to the base station according to the first message received by the receiver, where the second message includes information indicating that the second UE requests to act as relay UE for data transmission between the first UE and the base station. The receiver is further configured to receive a third message sent by the base station, where the third message instructs the second UE to act as the relay UE.

According to an eighth aspect, a base station is provided. The base station includes a receiver, configured to receive a first message, where the first message includes information requesting to allocate relay UE for data transmission between first UE and the base station. The base station also includes a transmitter, configured to send a second message to second UE, where the second message indicates that the second UE acts as the relay UE.

According to a ninth aspect, a base station is provided. The base station includes a transmitter, configured to send a first message to at least one user equipment UE, where the first message includes relay request information for data transmission between the base station and first UE. The base station also includes a receiver, configured to receive a second message sent by each of some or all UEs of the at least one UE, where the second message is a response message to the first message, and the some or all UEs include second UE. The transmitter is further configured to send a third message to the second UE, where the third message instructs the second UE to act as relay UE for data transmission between the base station and the first UE.

In the embodiments of the present invention, a base station specifies second UE as relay UE, so that the second UE can assist in data transmission between the base station and first UE. In this way, data transmission efficiency can be ensured.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
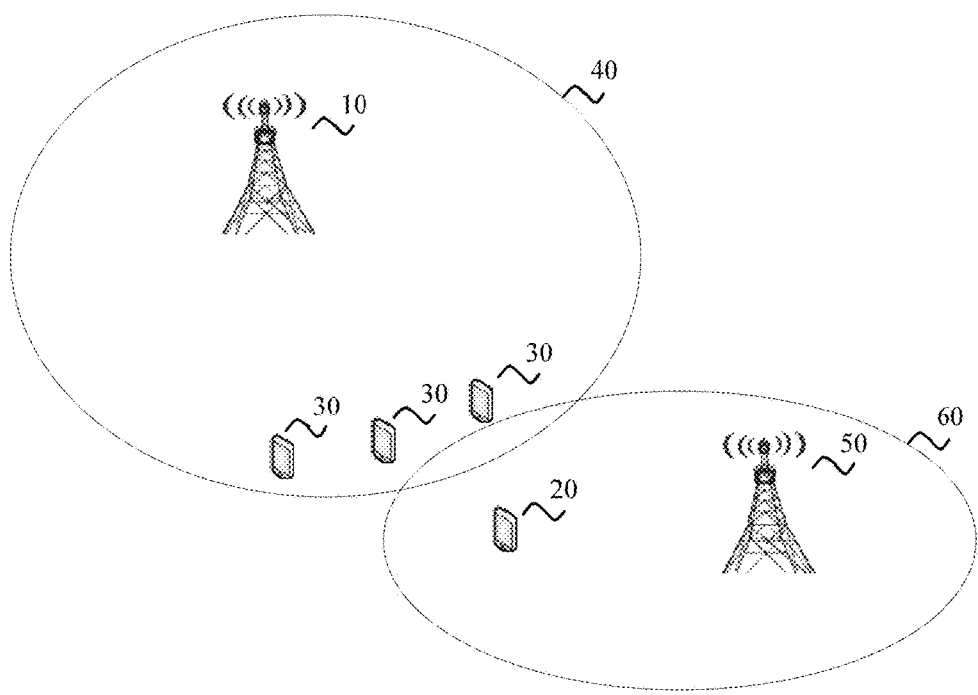
FIG. 1 is a schematic diagram of a scenario described in the background.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, including a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, and a Universal Mobile Telecommunications System (UMTS).

It should be further understood that, in the embodiments of the present invention, a base station may be a base transceiver station (BTS) in GSM or CDMA, or may be a NodeB (NB) in WCDMA, or may be an evolved Node B (eNB, or eNodeB) in LTE, or a base station device in a future 5G network, and this is not limited in the present invention.

It should be further understood that, in the embodiments of the present invention, UE may perform communication with one or more core networks via a radio access network (RAN). The UE may be referred to as an access terminal, a terminal device, a user unit, a user site, a mobile site, a mobile station, a remote station, a remote terminal, a mobile device, a user terminal, a terminal, a wireless communications device, a user proxy, or a user apparatus. The UE may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, or a terminal device in a future 5G network.

Device to device communication is a direct communication technology. Data exchanged between UEs does not need to be forwarded by a base station. The UEs may interact directly or interact directly with the assistance of a network.

Device to device communication has three working scenarios, which are respectively: an in-coverage working scenario, an out-of-coverage working scenario, and a partial-in-coverage working scenario. In the in-coverage working scenario, all user equipments participating in device to device communication are located within a service range of the base station. In the out-of-coverage scenario, all user equipments participating in device to device communication are located outside the service range of the base station. In the partial-in-coverage scenario, some of user equipments participating in device to device communication are located within the service range of the base station, and other user equipments are located outside the service range of the base station.

Descriptions of related terms: Device to device communication (D2D), means that data between multiple devices can be directly transmitted to each other during data transmission without the use of a third device. Typically, different UEs can directly perform reception and transmission with each other without forwarding by a network device such as a base station. A D2D link is also referred to as a sidelink in some cases. In embodiments of the present invention, the term D2D is used as a representation of the name. However, the term does not limit the scope of the methods in the present invention.

Device to device communication includes device to device discovery (D2D discovery) and D2D communication.

D2D discovery means that user equipment sends a discovery message, and another user equipment obtains, by reading the discovery message, information about the user equipment that sends the discovery message. The discovery message may include identification information such as an identity of the user equipment that sends the discovery message.

D2D discovery includes two types: type 1 and type 2. Type 1 means that resource pools of multiple user equipments for D2D discovery (which may also be referred to as resource pools for type-1 D2D discovery) are configured or selected by users themselves. Type 2 means that a sending resource of one user equipment for D2D discovery is configured by the base station.

D2D communication means that user equipment sends control information and data, and another user equipment obtains information such as a sending format of subsequent data by reading the control information, so as to correctly receive the subsequent data.

D2D communication includes two modes: mode 1 and mode 2. Mode 1 means that a base station or a relay node schedules a resource that is used by user equipment to transmit data and control information that are of device to device communication. Specifically, the control information may be a scheduling assignment (SA) message. In the mode 1 of D2D communication, a base station indicates, by using downlink signaling, a resource, a format, or the like that is used by user equipment to send scheduling assignment and data. Mode 2 means that user equipment selects, from a resource pool (the resource pool may be referred to as a resource pool for mode-2 D2D communication), a resource used for transmitting data and a SA message that are of direct communication. The resource pool for mode-2 D2D communication may include a SA message resource pool and a resource pool for data corresponding to the SA message. In other words, the user equipment may select, from the SA message resource pool, a resource used to transmit the SA message, and select, from the resource pool of the data corresponding to the SA message, a resource used to transmit the data corresponding to the SA message. The resource pool is a group of communication resources, which is a set of multiple communication resources.

Figure 2:
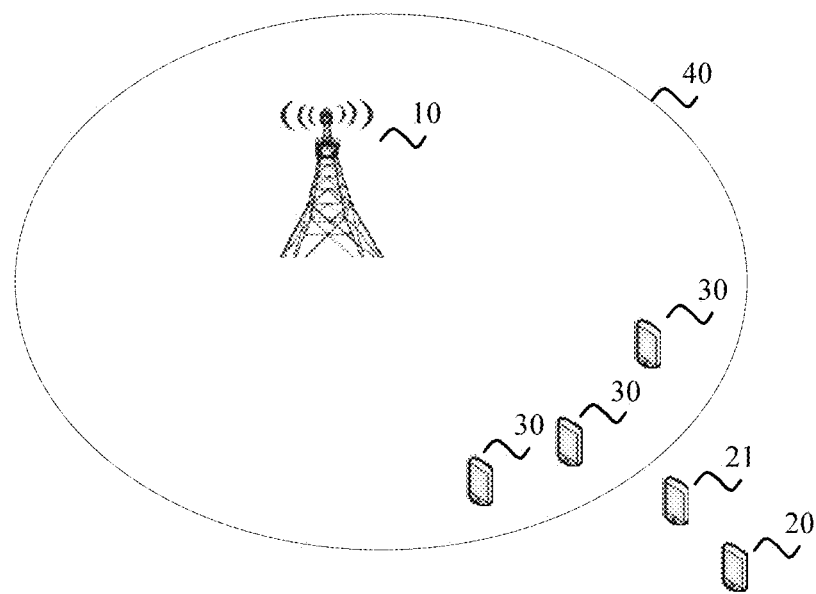
FIG. 2 is a schematic diagram of an application scenario according to an embodiment of the present invention.
Figure 2:
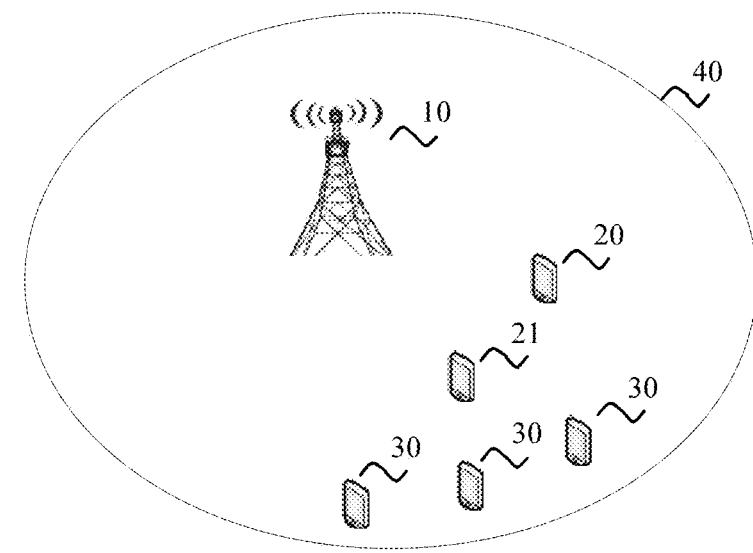

FIG. 2 is a schematic diagram of an application scenario according to an embodiment of the present invention. Specifically, this embodiment of the present invention is mainly used to implement data communication between a base station 10 and UE 20. In addition, FIG. 2 further shows UE 30 located in a cell 40 of the base station 10. That is, the base station 10 is a serving base station of the UE 30. In addition, in this embodiment of the present invention, it is assumed that D2D communication can be performed between the UE 20 and the UE 30.

In this embodiment of the present invention, the UE 30 can directly perform data transmission with the base station 10, and the UE 20 does not directly perform data transmission with the base station 10. Herein, a reason why the UE 20 does not directly perform data transmission with the base station 10 may be an objective reason, such as an excessively long distance or excessively poor signal quality, or may be a subjective reason. For example, the base station 10 does not allow the UE 20 to perform data transmission with the base station.

As shown in FIG. 2(*a*), the UE 20 is located outside the cell 40 of the base station 10. It is assumed that the UE 20 is initially located in the cell 40 of the base station 10; and subsequently, due to a location change, the UE 20 moves to the outside of the cell 40, and consequently is unable to directly perform communication with the base station 10. In this case, the UE 30 may act as relay UE, to assist in data transmission between the UE 20 and the base station 10. In this case, the UE 20 may be referred to as remote UE, and the UE 30 that acts as a relay may be referred to as relay UE.

In this scenario, for uplink data, the UE 20 may directly send data to the UE 30. Alternatively, the UE 20 may indirectly send data to the UE 30. For example, the data is first sent by the UE 20 to one or more intermediate UEs (UE 21 shown in FIG. 2 (*a*)), and then is forwarded by the one or more intermediate UEs to the UE 30. For downlink data, the UE 30 may directly send, to the UE 20, data sent by the base station 10. Alternatively, the UE 30 may indirectly send, to the UE 20 via one or more intermediate UEs (for example, the UE 21), data sent by the base station 10.

It should be noted that, although the UE 21 shown in FIG. 2 (*a*) is located outside the cell 40, the one or more intermediate UEs described herein may be all located outside the cell 40 or may be all located in the cell 40; or some of the multiple intermediate UEs are located in the cell 40 and the other intermediate UEs are located outside the cell 40. This is not limited in the present invention.

In this embodiment of the present invention, meanings of descriptions in that the UE 20 that acts as the remote UE is not located in a cell of the base station 10, or that the UE 20 is not located within a coverage range of the base station, or that the UE 20 is not located within a service range of the base station 10 are consistent.

It may be understood that, D2D communication between the UE 20 and the UE 30 that are shown in FIG. 2(*a*) is a partial-in-coverage scenario.

As shown in FIG. 2(*b*), although the UE 20 is located within a cell of the base station 10 in space, due to another reason, the UE 20 is unable to normally perform communication with the base station 10. For example, a fault occurs in a cellular link between the UE 20 and the base station 10. For another example, an electricity quantity of the UE 20 is excessively small. For still another example, although the UE 20 is located inside the cell in space, signal quality between the UE 20 and the base station 10 is excessively low (for example, the UE 20 is located in a basement whose network signal is relatively poor). There are still other examples. In this case, the UE 30 may also act as relay UE, to assist in the data transmission between the UE 20 and the base station 10.

In this scenario, for uplink data, the UE 20 may directly send data to the UE 30. Alternatively, the UE 20 may indirectly send data to the UE 30. For example, the data is first sent by the UE 20 to one or more intermediate UEs (UE 21 shown in FIG. 2 (*b*)), and then is forwarded by the one or more intermediate UEs to the UE 30. For downlink data, the UE 30 may directly send, to the UE 20, data sent by the base station 10. Alternatively, the UE 30 may indirectly send, to the UE 20 via one or more intermediate UEs (for example, the UE 21), data sent by the base station 10.

It may be understood that, D2D communication between the UE 20 and the UE 30 that are shown in FIG. 2(*b*) is an in-coverage scenario.

In this way, in the scenarios shown in FIG. 2, one or more of UEs 30 may act as relay nodes, and therefore, there are at least two direct links between the UE 20 and the base station 10. It should be understood that, relay networks are an important direction towards satisfying increasing requirements of a communications system for high-frequency utilization and a high data transmission capability.

For ease of description, this specification describes the methods in the present invention below by using an example in which only one relay UE is used in data transmission from remote UE to a base station. However, this does not exclude a method for relaying data from remote UE to a base station by using multiple intra-network and/or inter-network relay UEs. A difference between the two methods lies in whether data is directly transmitted from the remote UE to relay UE that finally sends the data to the base station and, or is forwarded by using multiple other relay UEs.

A method for selecting relay UE in the application scenario and a method for further performing data transmission method via the relay UE are described in detail in subsequent embodiments of the present invention.

Figure 3:
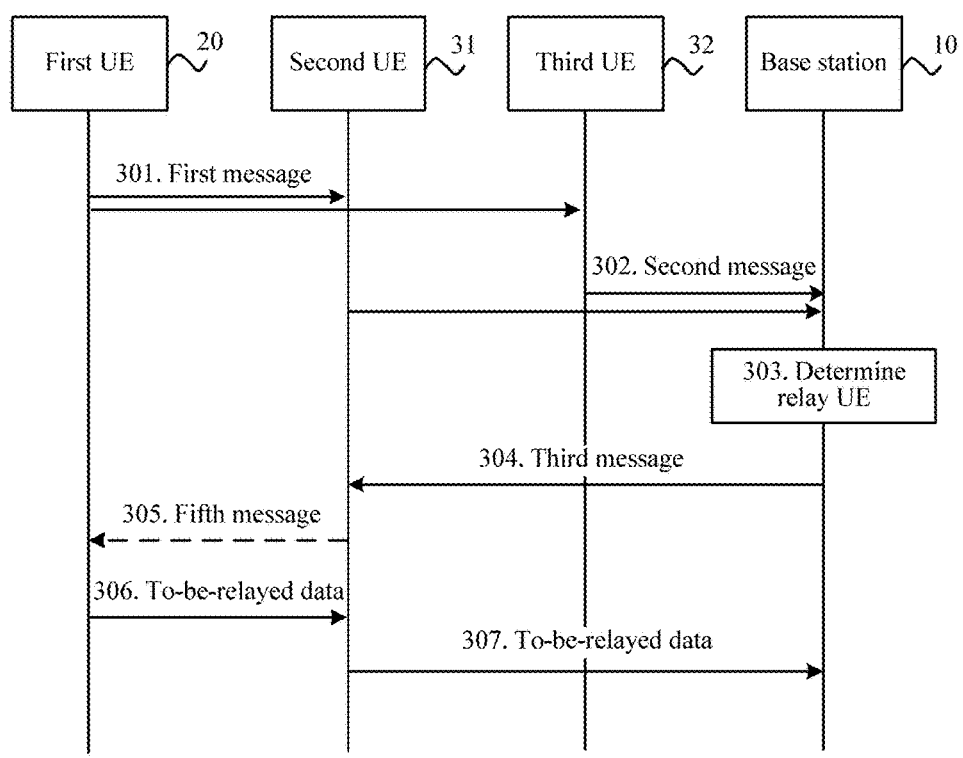
FIG. 3 is an interaction flowchart of a data transmission method according to an embodiment of the present invention.

FIG. 3 is an interaction flowchart of a data transmission method according to an embodiment of the present invention. FIG. 3 shows a base station 10, first UE 20, second UE 31, and third UE 32.

The base station 10 may be considered as the base station 10 in FIG. 2. The first UE 20 may be considered as the UE 20 in FIG. 2(*a*) or FIG. 2(*b*). The second UE 31 may be considered as one of the UEs 30 in FIG. 2. The third UE 32 may be considered as another one of the UEs 30 in FIG. 2. The second UE 31 and the third UE 32 are located in a cell of the base station 10. That is, the base station 10 is a serving base station of the second UE 31 and the third UE 32. In addition, the first UE 20 may perform D2D communication with the second UE 31. The first UE 20 may perform D2D communication with the third UE 32. The second UE 31 may perform communication with the base station 10 by using a cellular link. The third UE 32 may perform communication with the base station 10 by using a cellular link.

In this embodiment of the present invention, it is assumed that the first UE 20 is unable to directly perform data transmission with the base station 10. A reason why the first UE 20 is unable to directly perform communication with the base station 10 may be that the first UE 20 does not satisfy a condition for directly performing communication with the base station 10, or may be that a network side indicates that the first UE 20 needs to perform communication with the base station 10 via relay UE.

It should be noted that, for uplink transmission, the first UE 20 is original UE that needs to send data, the second UE 31 is relay UE, and the second UE 31 directly performs data transmission with the base station 10. In the present invention, what needs to be implemented is a process in which to-be-sent data of the first UE is sent to the base station via the second UE. Optionally, the first UE may directly send the to-be-sent data to the base station by means of one hop via the second UE. Optionally, the first UE may send the to-be-sent data to one or more intermediate UEs and then the to-be-sent data is sent to the second UE. The second UE then forwards, to the base station, the to-be-sent data received from the first UE. However, in any case, the first UE 20 described in this embodiment of the present invention is original UE that needs to send data, and the second UE 30 is UE that directly sends, to the base station 10, to-be-sent data received from the first UE.

The method shown in FIG. 3 includes the following steps.

301. The first UE 20 sends a first message in a D2D manner, where the first message includes relay request information.

Herein, the relay request information may be construed as information requesting to determine (or specify or allocate) relay UE for data transmission between the first UE 20 and the base station 10. In addition, the relay request information may be explicitly or implicitly included in the first message.

The relay request information may be a field that is sent in the first message to explicitly indicate the relay request information or implicitly indicate the relay request information, or may be relay request information that is implicitly indicated in another manner and that is sent together with the first message. The another manner used to indicate the relay request information includes a transmission manner in which the first message is transmitted in any particular manner, for example, a position or a range of a time-frequency resource used by the first message, a scrambling sequence used by the first message, a cyclic redundancy check (CRC) mask used by the first message, or a sequence of a demodulation reference signal used by the first message.

The relay request information may be indicated by a reference signal and/or a D2D synchronization signal. That is, the first message may include the reference signal and/or the D2D synchronization signal, to indicate the relay request information. The reference signal is a signal sent by using a particular sequence. For example, the reference signal may be: a reference signal used for positioning, a demodulation reference signal that is used to demodulate a data channel during D2D transmission, or a demodulation reference signal used for D2D control channel demodulation. The D2D synchronization signal is a reference signal that is sent on a D2D link for synchronizing D2D link devices, for example: a primary synchronization signal used for D2D communication, a secondary synchronization signal used for D2D communication, or a synchronization signal used for D2D communication, or a synchronization signal used for D2D discovery. That the relay request information is indicated by a reference signal and/or a D2D synchronization signal means that a particular reference signal and/or a particular synchronization signal is sent to carry the relay request information. It means that a resource used by the signal is particular. The resource includes at least one of the following: a particular time domain resource, a particular frequency domain resource, a particular code domain resource (a particular cyclic shift, a particular orthogonal mask, a particular scrambling sequence, or the like of a sequence used by the reference signal), or a particular space domain resource (a particular antenna port or a particular space layer). The particular resource may be predefined, or may be configured by using signaling delivered by using a cellular link or signaling transmitted by using a D2D link.

Alternatively, the first message may be in a form of a reference signal and/or a D2D synchronization signal. That is, a reference signal and/or a synchronization signal are used to represent a relay request. For example, one type of reference signal and/or D2D synchronization signal is directly defined as a relay request reference signal and/or a relay request D2D synchronization signal. When the first UE has a relay request, the signal is directly sent. The signal has particular sending characteristics. These characteristics include: using a particular time domain resource, a particular frequency domain resource, a particular code domain resource (a particular cyclic shift of a sequence used by the reference signal, a particular orthogonal mask, a particular scrambling sequence, or the like), or a particular space domain resource (a different antenna port or a different space layer). The particular resource may be predefined, or may be configured by using signaling delivered by using a cellular link or signaling transmitted by using a D2D link.

Specifically, when the first UE 20 needs to send uplink data to the base station 10, because the first UE 20 is unable to directly perform data transmission with the base station 10, the first UE 20 sends a first message. The uplink data that needs to be sent by the first UE 20 to the base station 10 may be referred to as to-be-relayed data.

Herein, a reason why the first UE 20 is unable to perform data transmission with the base station 10 is as follows.

(1) The base station 10 is a serving base station of the first UE 20, but the base station 10 indicates that the first UE 20 needs to perform communication with the base station 10 via relay UE.

(2) The base station 10 is a serving base station of the first UE 20, but the first UE 20 is unable to establish a valid RRC connection to the base station 10.

(3) The first UE 20 is located outside a service range of the base station 10. In other words, the base station 10 is not a serving base station of the first UE 20.

Specifically, the first UE 20 sends the first message in a D2D broadcast form. In this way, UE that can perform D2D communication with the first UE can receive the first message.

The first message may include at least one of the following: an identity (ID) of the first UE, network status information of the first UE, a destination address of to-be-relayed data, a magnitude of a data amount of the to-be-relayed data, or quality of service (QoS) class information of the to-be-relayed data.

The network status information of the first UE is used to indicate a network status of the first UE, and the network status of the first UE may be any one of the following: the first UE is located within a network, the first UE is located outside a network, the first UE is located within a network and can establish an RRC connection, the first UE is located within a network but has a radio link failure (RLF), the first UE is located within a network but is restricted to or forbidden from performing transmission by using a cellular link or does not have a function of or a module for performing communication by using a cellular link, or the first UE is located outside a network but uses an intra-network D2D synchronization source as synchronization reference.

The network status information of the first UE may indicate that the first UE 20 is located outside a service range of the base station 10.

The destination address of the to-be-relayed data may be the base station 10, or the destination address of the to-be-relayed data may be another base station or another UE in a cell of another base station, but the to-be-relayed data needs to be forwarded by the base station 10. That is, the to-be-relayed data needs to be sent to the base station 10.

For QoS classes, refer to a table of QoS class identifiers (QCI) shown in the following Table 1.

TABLE 1

| QCI | Resource type | Priority | Packet delay budget | Packet error rate | Example of services |
|---|---|---|---|---|---|
| 1 |  | 2 | 100 ms | $10^{-2}$ | Session voice |
| 2 | GBR | 4 | 150 ms | $10^{-3}$ | Session video (live streaming media) |
| 3 |  | 3 | 50 ms | $10^{-3}$ | Live game |
| 4 |  | 5 | 300 ms | $10^{-6}$ | Non-session video (buffered streaming media) |
| 5 |  | 1 | 100 ms | $10^{-6}$ | Signaling |
| 6 |  | 6 | 300 ms | $10^{-6}$ | Buffered video, and TCP-based application (web page, mail, and chat) |
| 7 | Non-GBR | 7 | 100 ms | $10^{-3}$ | Voice |
| 8 |  | 8 | 300 ms | $10^{-6}$ | Buffered video, and TCP-based application (web page, mail, and chat) |
| 9 |  | 9 |  |  | Sharing |

In this embodiment of the present invention, it is assumed that the second UE 31 and the third UE 32 can receive the first message sent by the first UE 20.

It should be noted that, in 301, the first UE 20 may directly send the first message to the second UE 31 and the third UE 32, or may indirectly send the first message to the second UE 31 and the third UE 32, and this is not limited in the present invention. For example, the first UE 20 may indirectly send the first message to the second UE 31 and the third UE 32 via one or more intermediate UEs.

Optionally, an example in which the first message is sent to the second UE 31 is used. The relay request information may be understood as information that the first UE 20 requests the second UE 31 to act as the relay UE.

302. The second UE 31 and/or the third UE 32 sends a second message to the base station 10, where the second message includes information requesting to act as relay UE for data transmission between the first UE and the base station.

Herein, the UE that sends the second message to the base station 10 may be referred to as candidate relay UE, and the second message includes request information requesting to act as the relay UE for data transmission between the first UE 20 and the base station 10.

For example, if the second UE 31 expects to act as the relay UE for data transmission between the first UE 20 and the base station 10, the second UE 31 sends the second message to the base station 10, and the second message includes request information related to the expectation.

Optionally, in an embodiment, using the second UE 31 as an example, after receiving the first message, the second UE 31 may forward the first message to the base station, and the forwarded first message may be considered as the second message in 302. That is, the second UE 31 forwards the first message, which implicitly includes the information requesting to act as the relay UE.

Optionally, in an embodiment, after receiving the first message, the second UE 31 and the third UE 32 can each learn a relay request of the first UE 20, and then send the second message to the base station 10.

Optionally, in another embodiment, 302 includes: after receiving the first message, determining, by each of the second UE 31 and the third UE 32, whether the preset first condition is satisfied; and when determining that the preset first condition is satisfied, sending the second message to the base station 10.

The preset first condition includes at least one of the following: the network status information of the first UE indicates that the first UE is unable to directly perform data transmission with the base station, signal quality between the second UE and the base station is lower than a first threshold and higher than a second threshold, or received signal quality at which the second UE receives the first message is higher than a third threshold.

Optionally, if the first message includes the network status information of the first UE, the preset first condition may be: the network status information of the first UE indicates that the first UE is unable to directly perform data transmission with the base station. Using the second UE 31 as an example, if the first message includes the network status information of the first UE, the second UE 31 may first determine content indicated by the network status information. If it indicates that the first UE is unable to directly perform data transmission with the base station, the second UE 31 may send the second message to the base station 10.

Optionally, the preset first condition may be: the signal quality between the second UE and the base station is lower than the first threshold and greater than the second threshold. Herein, the first threshold and the second threshold may be predefined by using a protocol or may be configured by the base station by using signaling. It may be understood that, the first threshold is greater than the second threshold. That the signal quality between the second UE and the base station is lower than the first threshold indicates that the second UE is located at an edge of the cell. That the signal quality between the second UE and the base station is greater than the second threshold indicates that signal quality of the second UE meets a communication requirement.

Optionally, the preset first condition may be: the received signal quality at which the second UE receives the first message is higher than the third threshold. Using the second UE 31 as an example, the second UE 31 needs to first determine the received signal quality of receiving the first message, and then compare the received signal quality with the third threshold. Herein, the third threshold may be predefined, or may be pre-configured by the base station by using signaling.

That is, the second UE 31 and the third UE 32 may determine, by determining whether the preset first condition is satisfied, whether the second UE 31 and the third UE 32 can act as candidate relay UEs.

Optionally, in another embodiment, the second UE 31 and the third UE 32 may each send the second message to the base station 10 according to a preset probability.

That is, the second UE 31 and the third UE 32 may determine, by using the preset probability, whether the second UE 31 and the third UE 32 can act as candidate relay UEs.

Alternatively, when it is determined that the preset first condition is satisfied, the second message is sent to the base station 10 according to the preset probability.

That is, the second UE 31 and the third UE 32 may determine, by determining whether the preset first condition is satisfied and by using the preset probability, whether the second UE 31 and the third UE 32 can act as the candidate relay UEs.

In this way, in this embodiment of the present invention, by means of a probability-based selection method, information reported to the base station can be reduced, and workload of selecting relay UE by the base station can be reduced, further improving efficiency of selecting the relay UE.

The base station may first pre-configure (for example, by using a broadcast message or an RRC message) or predefine a probability value Prb. In this way, the second UE 31 and the third UE 32 may each send the second message according to the probability value Prb.

For example, if Prb=0.5, a probability of sending the second message is 50%. Using the second UE 31 as an example, an actual determining method may be: generating, by the second UE 31, a random number from 0 to 100 in an equal probability manner; and if the generated random number is greater than 50, determining, by the second UE 31, to send the second message this time; otherwise, determining not to send the second message this time.

For another example, if Prb=0.25, the second UE 31 generates a random number from 0 to 100 in an equal probability manner. If the generated random number is greater than 20, the second UE 31 determines that the second UE 31 can send the second message this time; otherwise, the second UE 31 determines not to send the second message this time.

In this embodiment of the present invention, the second message further includes an ID of the second UE 31, to indicate a source address of the second message.

Optionally, the second message may further include an ID of the base station 10, to indicate a destination address of the second message.

Optionally, the second message may further include: the ID of the first UE 20 and information about signal quality of the first UE. Herein, the information about the signal quality may be subsequently used by the base station 10 to determine the relay UE.

The information about the signal quality of the first UE is quality information that is obtained by the second UE by means of measurement according to the received first message sent by the first UE or the reference signal and/or the D2D synchronization signal sent by the first UE and that corresponds to the signal transmitted by the first UE. The information may be at least one of: reference signal received power (RSRP), reference signal received quality (RSRQ), or a received signal strength indication (RSSI). The reference signal may be a demodulation reference signal or may be some or all signals in the D2D synchronization signal.

It may be understood that, in another scenario, if the first message is sent by the first UE 20 to the second UE 31 via one or more intermediate UEs, the information about the signal quality of the first UE included in the second message may be obtained by the second UE 31 from the intermediate UE.

It may be understood that, if the first message includes the magnitude of the data amount of the to-be-relayed data, the second message may include relay resource request information, to request a transmission resource for the to-be-relayed data, so that the base station allocates an uplink sending resource of a suitable amount to the second UE. If the first message includes the QoS class information of the to-be-relayed data, the second message may include the QoS class information of the to-be-relayed data, so that a corresponding QoS requirement is considered when the base station allocates an uplink sending resource to the second UE.

Optionally, when the second UE 31 and the third UE 32 each send the second message, the timer may be started. In this way, if no reply message of the base station 10 is received within a time that is set by the timer, it may be considered that the base station 10 does not use the second UE 31 and the third UE 32 as the relay UEs. Alternatively, if no reply message of the base station 10 is received within a time that is set by the timer, the second message may be retransmitted. A maximum quantity of retransmissions may be preset, or may be pre-configured by the base station 10.

It should be noted that, in this embodiment, a quantity of UEs that receive the first message is greater than or equal to a quantity of UEs that send the second message.

303. The base station 10 determines the relay UE.

It may be understood that, the base station 10 receives second messages sent by at least one UE, and selects one of the at least one UE as the relay UE.

It may be understood that, the base station 10 selects one or more UEs from at least one candidate relay UE as relay UEs.

Specifically, the base station 10 may determine the relay UE according to information about signal quality between the at least one UE and the base station 10.

For example, the base station 10 may determine UE as the relay UE, where information about signal quality between the UE and the base station 10 is optimal.

Alternatively, if the second message includes the information about the signal quality of the first UE, the base station 10 may determine the relay UE according to information about signal quality between the at least one UE and the first UE 20.

For example, if the signal quality of receiving, by the second UE 31, the first message sent by the first UE is greater than signal quality of receiving, by the third UE 32, the first message sent by the first UE, the base station 10 may determine the second UE 31 as the relay UE.

It should be noted that, in this embodiment, the base station 10 may determine one or more relay UEs. That is, the base station 10 may specify one or more UEs of the at least one UE as relay UEs, and this is not limited in the present invention.

Herein, it is assumed that the relay UE determined by the base station 10 is the second UE 31.

304. The base station 10 sends a third message to the second UE 31, where the third message includes indication information instructing the second UE to act as the relay UE for data transmission between the first UE and the base station.

That is, the third message instructs the second UE to act as the relay UE for data transmission between the first UE and the base station.

It may be understood that, the base station 10 sends the third message to the relay UE determined in 303. If multiple relay UEs are determined in 303, the base station 10 sends the third message to the multiple relay UEs.

In addition, if the second message includes the relay resource request information, the third message may further include relay resource allocation indication information.

Optionally, the relay resource allocation indication information may be indicated by higher layer signaling and/or physical layer signaling. The physical layer signaling may include downlink control information (DCI), and the DCI may be identified by a radio network temporary identifier (RNTI) related to the relay.

It should be noted that, the third message, used as a response to the second message, may be a direct response data packet or direct response signaling, or may be implicit indication signaling. For example, the third message gives indication by using a new DCI format (for example, by using the RNTI related to the relay as CRC scrambling of the DCI).

It may be understood that, if the second UE 31 starts the timer when sending the second message in 302, it may be understood that 304 means that the second UE 31 receives the third message from the base station 10 within the time that is set by the timer.

Optionally, the base station 10 may further send a fourth message to the third UE 32. The fourth message includes indication information indicating that the third UE 32 cannot act as the relay UE for data transmission between the first UE and the base station. That is, the fourth message indicates that the third UE 32 cannot act as the relay UE.

Alternatively, the base station 10 may not send any response message to the third UE 32. In this way, after the time that is set by the timer, the third UE 32 may also determine that the base station 10 does not use the third UE 32 as the relay UE.

In this way, after receiving the third message, the second UE 31 may know that the base station 10 already determines the second UE 31 as the relay UE. In this case, optionally, the second UE 31 may perform 305.

305. The second UE 31 sends a fifth message to the first UE 20.

It may be understood that, the fifth message is a response message to the first message, and the fifth message indicates that the second UE acts as the relay UE for data transmission between the first UE and the base station.

In this way, the first UE 20 can know that the relay UE for data transmission between the first UE 20 and the base station is the second UE 31.

306. The first UE 20 sends to-be-relayed data to the second UE 31.

Herein, the first UE 20 may send the to-be-relayed data in the D2D broadcast form. Although all UEs that can perform D2D communication with the first UE 20 can receive the to-be-relayed data, only the second UE 31 is instructed to act as the relay UE, and only the second UE 31 performs 307.

Alternatively, the first UE 20 may send the to-be-relayed data to the second UE 31 by using a D2D link, between the first UE 20 and the second UE 31.

It may be understood that, if the base station 10 determines multiple relay UEs in 303, all the multiple relay UEs receive, in 306, the to-be-relayed data sent by the first UE 20.

307. The second UE 31 sends the to-be-relayed data to the base station 10.

Herein, if the third message includes the relay resource allocation indication information, the second UE 31 may send the to-be-relayed data according to the relay resource allocation indication information.

Figure 4:
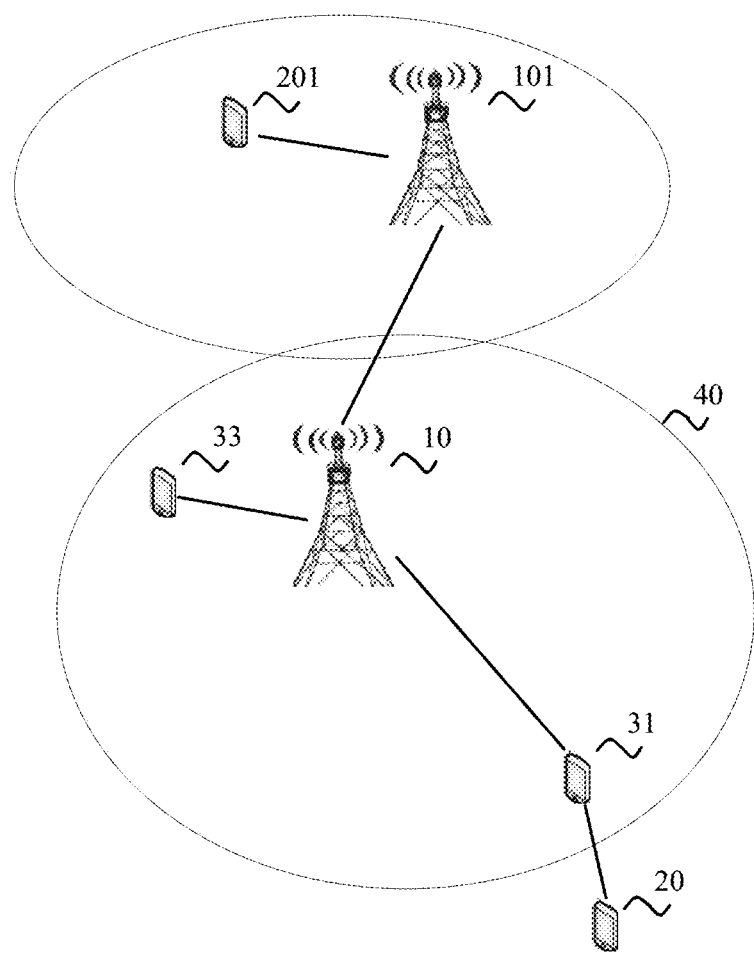
FIG. 4 is a schematic diagram of another application scenario according to an embodiment of the present invention.

Further, if the destination address of the to-be-relayed data is another UE in the cell 40 of the base station 10. As shown in FIG. 4, it is assumed that the another UE is UE 33, the base station 10 forwards the to-be-relayed data to the UE 33. It may be understood that, in this case, the UE 33 and the first UE 20 do not satisfy a D2D communication condition, and are unable to perform D2D communication.

Alternatively, further, if the destination address of the to-be-relayed data is another base station: a base station 101 shown in FIG. 4, the base station 10 forwards the to-be-relayed data to the base station 101.

Alternatively, if the destination address of the to-be-relayed data is UE in another cell: UE 201 shown in FIG. 4, the base station 101 forwards the to-be-relayed data to the base station 101, and then the base station 101 sends the to-be-relayed data to the UE 201.

It may be understood that, in this embodiment of the present invention, the base station 101 and the base station 101 may be interconnected by using an X2 interface, and the base station 101 and the base station 101 may be respectively connected to a mobility management entity (MME) and a serving gateway (S-GW) by using an S1 interface. This is not limited in the present invention.

In this embodiment of the present invention, relay UE is specified by a base station, so that efficiency of selecting the relay UE can be improved, a time spent on selecting the relay UE can be shortened, and unnecessary UEs that participate in relay can be reduced. Further, a problem of uplink transmission from first UE to the base station can be resolved.

Figure 5:
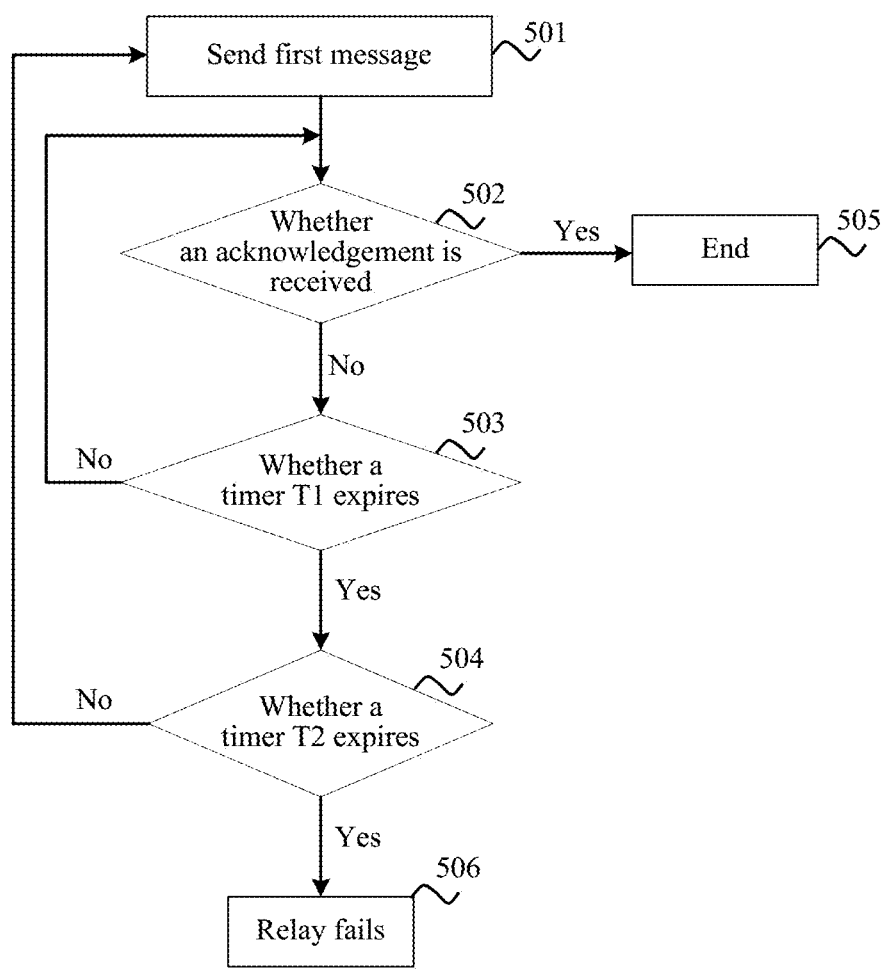
FIG. 5 is a flowchart of a method for determining whether relay is successfully performed according to an embodiment of the present invention.

Optionally, a timer may be started when the first UE 20 sends the first message in 301, and a specific procedure may be shown in FIG. 5.

501. Send the first message.

For details, refer to the description in 301. To avoid repetition, details are not described herein again.

In addition, the timer is started at the same time when the first UE 20 sends the first message.

502. Determine whether an acknowledgement is received.

Herein, the acknowledgement may be an acknowledgement message, such as the fifth message in 305, for the first message. It may be understood that, if the first UE 20 receives the acknowledgement, the first UE 20 can know that the base station already determines the relay UE.

If a result of the determining in 502 is yes, in other words, the acknowledgement is received, 505 is performed; if a result of the determining in 502 is not, in other words, the acknowledgement is not received, 503 is performed.

503. Determine whether a timer T1 expires.

Herein, duration T1 that is set by the timer may be predefined, or may be pre-configured by the base station 10.

If a result of the determining in 503 is not, 502 is performed again. That is, if the timer T1 does not time out, the first UE 20 continues to wait to receive the acknowledgement.

If a result of the determining in 503 is yes, 504 is performed.

504. Determine whether a timer T2 expires.

Herein, duration T2 that is set by the timer may be predefined, or may be pre-configured by the base station 10, and T2 is greater than T1.

T2 may be set to an integer multiple of T1. For example, T2=10×T1. This is equivalent to that a relay request process can be tried for ten times, and a time of each try is T1.

If a result of the determining in 504 is not, 501 is performed again to retransmit the first message. Optionally, the retransmitted first message may include a quantity of times of requesting relay. In this way, when QoS is the same, UE that receives the first message may preferentially process a service whose quantity of times of requesting relay is the largest.

If a result of the determining in 504 is yes, 506 is performed.

505. End.

In this case, the base station 10 already specifies the relay UE, and the first UE 20 may stop the timer and perform subsequent 306.

506. Relay fails.

Herein, it should be noted that: the time in step 504 is optional. That is, in the steps in FIG. 5, the timer T2 may not be determined and step 506 may be directly performed.

It indicates that no UE near the first UE 20 is suitable to act as the relay UE. A reason why the relay fails may be: no UE that receives the first message can act as the relay UE, or no UE can receive the first message because the first UE 20 is excessively far away from the cell of the base station 10.

Figure 6:
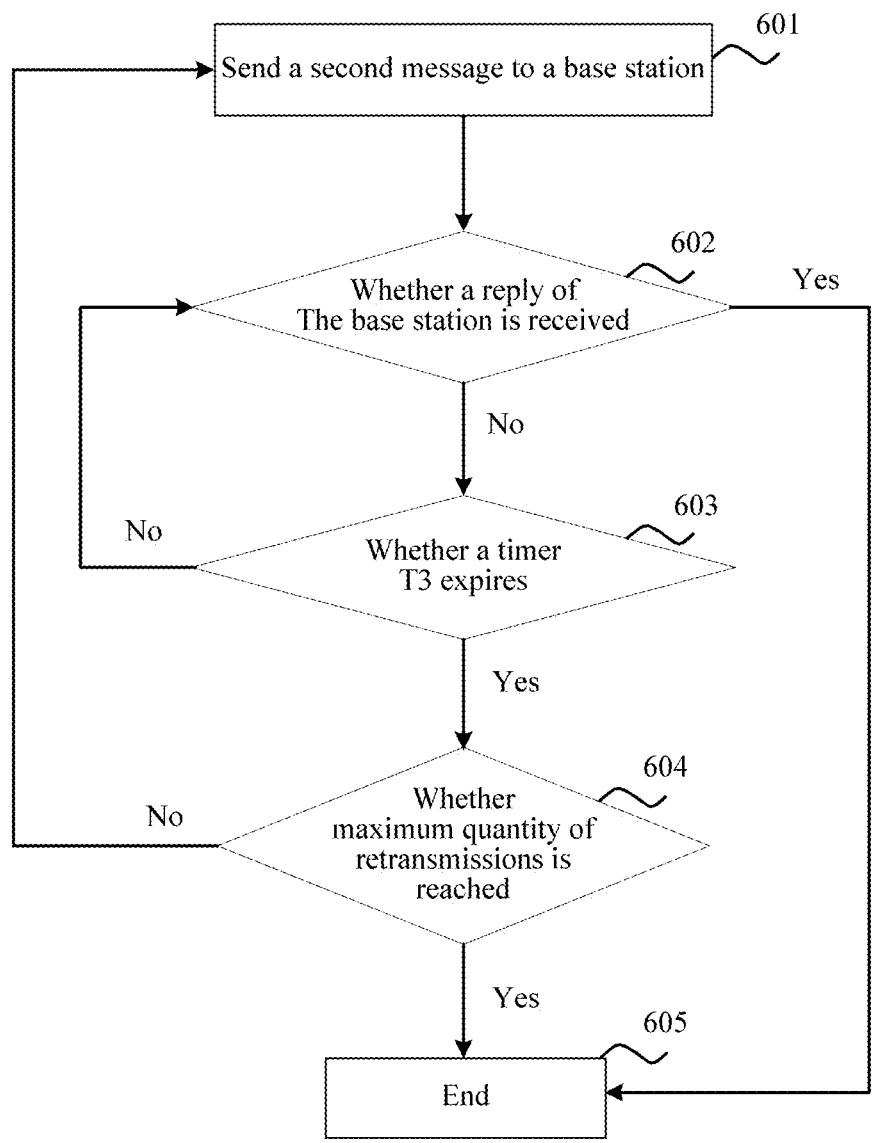
FIG. 6 is a flowchart of a method for determining whether to act as relay UE according to an embodiment of the present invention.

Similarly, a timer may be started when the second UE 31 and the third UE 32 each send the second message to the base station 10 in 302, and a specific procedure may be shown in FIG. 6.

601. Send the second message to the base station 10.

602. Determine whether a reply of the base station 10 is received.

The reply of the base station 10 may be an acknowledgement, such as the third message in 304, for the second message; or the reply of the base station 10 may be a negative acknowledgement, such as the fourth message in 304, for the second message.

If a result of the determining in 602 is yes, 605 is performed; if a result of the determining in 602 is not, 603 is performed.

603. Determine whether the timer expires.

Herein, duration T3 that is set by the timer may be predefined, or may be pre-configured by the base station 10.

If a result of the determining in 603 is yes, 604 is performed; if a result of the determining in 603 is not, 602 is performed again.

604. Determine whether a maximum quantity of retransmissions is already reached.

A maximum value may be predefined as a maximum quantity of retransmissions, or may be a preset by the base station 10 as a maximum quantity of retransmissions. If a result of the determining 604 is yes, 605 is performed; if a result of the determining in 604 is not, 601 is performed again to retransmit the second message.

605. End. That is, the timer is stopped.

It may be understood that, if an acknowledgement is received in 602, it indicates that the second UE 31 and/or the third UE 32 can act as the relay UE. If a negative acknowledgement is received in 602, it indicates that the second UE 31 and/or the third UE 32 cannot act as the relay UE. Likewise, if no reply is received when the maximum quantity of retransmissions is reached in 604, it also indicates that the second UE 31 and/or the third UE 32 cannot act as the relay UE. In this case, relay preparation may continue to be performed for another remote UE.

It may be understood that, in this embodiment of the present invention, by setting a timer, loss caused by one single selection failure can be avoided, and a failure of an entire process due to one occasional selection failure is avoided.

Figure 7:
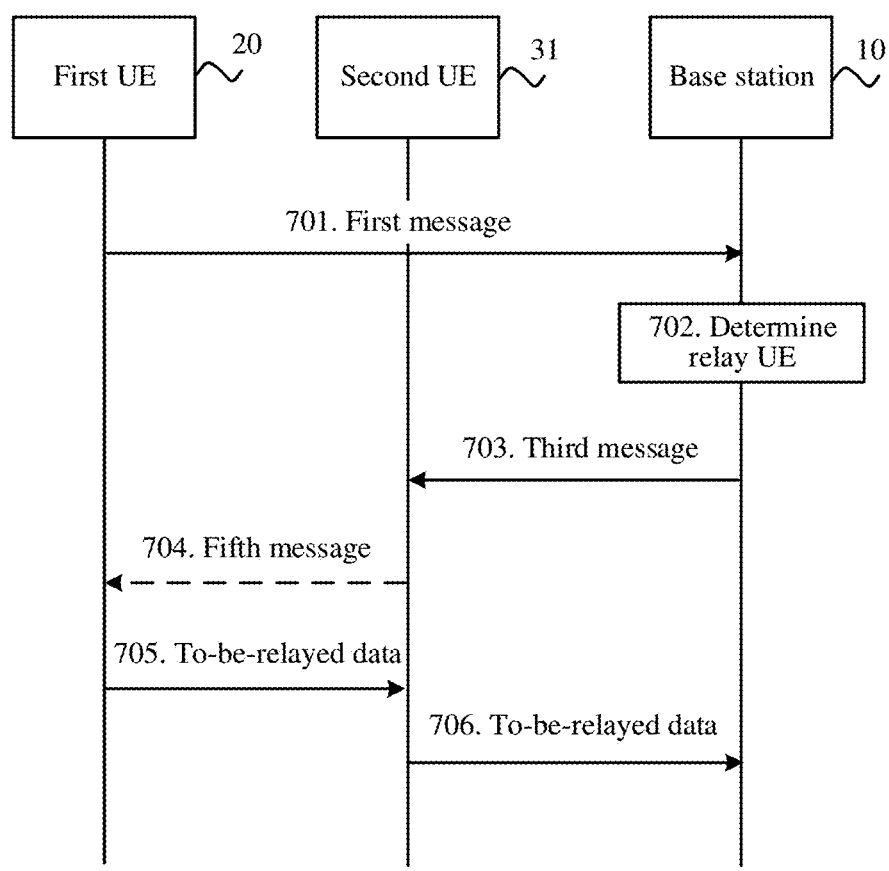
FIG. 7 is an interaction flowchart of a data transmission method according to another embodiment of the present invention.

FIG. 7 is an interaction flowchart of a data transmission method according to another embodiment of the present invention. FIG. 7 shows a base station 10, first UE 20, and second UE 31. The method shown in FIG. 7 is applicable to the scenario shown in FIG. 2 (*b*). The method shown in FIG. 7 includes the following steps.

701. The first UE 20 sends a first message to the base station 10, where the first message includes relay request information of the first UE 20.

It may be understood that, the relay request information may be understood as information that the first UE 20 requests the base station 10 to allocate (or determine) relay UE for data transmission between the first UE 20 and the base station 10. That is, it may be understood as that the first message includes information requesting to allocate the relay UE for data transmission between the first UE and the base station.

Herein, the first UE 20 may send the first message to the base station 10 by using a cellular link.

Optionally, before 701, the first UE 20 may receive indication information sent by the base station 10. The indication information indicates that the first UE 20 needs to perform data transmission with the base station 10 via the relay UE. That is, the base station 10 does not allow the first UE 20 to directly perform data transmission with the base station 10.

Specifically, for the first message, refer to the description of the first message in the embodiment in FIG. 3. To avoid repetition, details are not described herein again.

Optionally, the first message may include at least one of the following: an identity ID of the first UE, a destination address of to-be-relayed data, a magnitude of a data amount of the to-be-relayed data, or QoS class information of the to-be-relayed data.

The destination address of the to-be-relayed data may be the base station 10, or may be another UE or another base station.

The magnitude of the data amount of the to-be-relayed data may be used by the base station 10 to allocate an uplink sending resource of a suitable amount.

The QoS class information of the to-be-relayed data may be used to enable a corresponding QoS requirement to be considered when the base station 10 allocates the uplink sending resource.

702. The base station 10 determines relay UE.

Specifically, the base station 10 may determine the relay UE according to the first message.

In an example, the base station 10 may determine UE, which is assumed to be at least one UE (for example, the second UE 31 and third UE 32), near a source of the first message: the first UE 20 according to a history message or the like. That is, the base station 10 may determine, according to the history message, that the at least one UE (the second UE 31 and the third UE 32) can perform D2D transmission with the first UE 20.

Further, the base station 10 may select one or more UEs from the at least one UE as relay UEs.

Specifically, the base station 10 may determine the relay UE according to information about signal quality between the at least one UE and the base station 10.

Alternatively, if the base station 10 can obtain, from the history message, information about signal quality between the at least one UE and the first UE 20, the base station 10 may determine the relay UE according to the information about the signal quality between the at least one UE and the first UE 20.

Herein, it is assumed that the relay UE determined by base station 10 is the second UE 31.

703. The base station 10 sends a third message to the second UE 31, where the third message includes indication information instructing the second UE to act as the relay UE for data transmission between the first UE and the base station.

That is, the third message instructs the second UE to act as the relay UE for data transmission between the first UE and the base station.

Optionally, if the first message includes the magnitude of the data amount of the to-be-relayed data, or if the first message includes the magnitude of the data amount of the to-be-relayed data and the QoS class information of the to-be-relayed data, the third message may further include relay resource allocation indication information.

Optionally, the relay resource allocation indication information may be indicated by higher layer signaling and/or physical layer signaling. The physical layer signaling may include DCI, and the DCI may be identified by an RNTI related to the relay.

704. The second UE 31 sends a fifth message to the first UE 20.

705. The first UE 20 sends to-be-relayed data to the second UE 31.

706. The second UE 31 sends the to-be-relayed data to the base station 10.

Specifically, for 704, refer to the description of 305 in the embodiment in FIG. 3. For 705, refer to the description of 306 in the embodiment in FIG. 3. For 706, refer to the description of 307 in the embodiment in FIG. 3. To avoid repetition, details are not described herein again.

It may be understood that, when the first UE 20 sends the first message in 701, a timer may be started. For a specific process, similarly refer to the process shown in FIG. 5. To avoid repetition, details are not described herein again.

It can be seen that, for uplink data transmission from first UE to a base station, the method procedure shown in FIG. 3 or FIG. 7 may be used. The base station specifies second UE as relay UE, so that data sent by the first UE can be sent to the base station via the second UE, ensuring data transmission.

Figure 8:
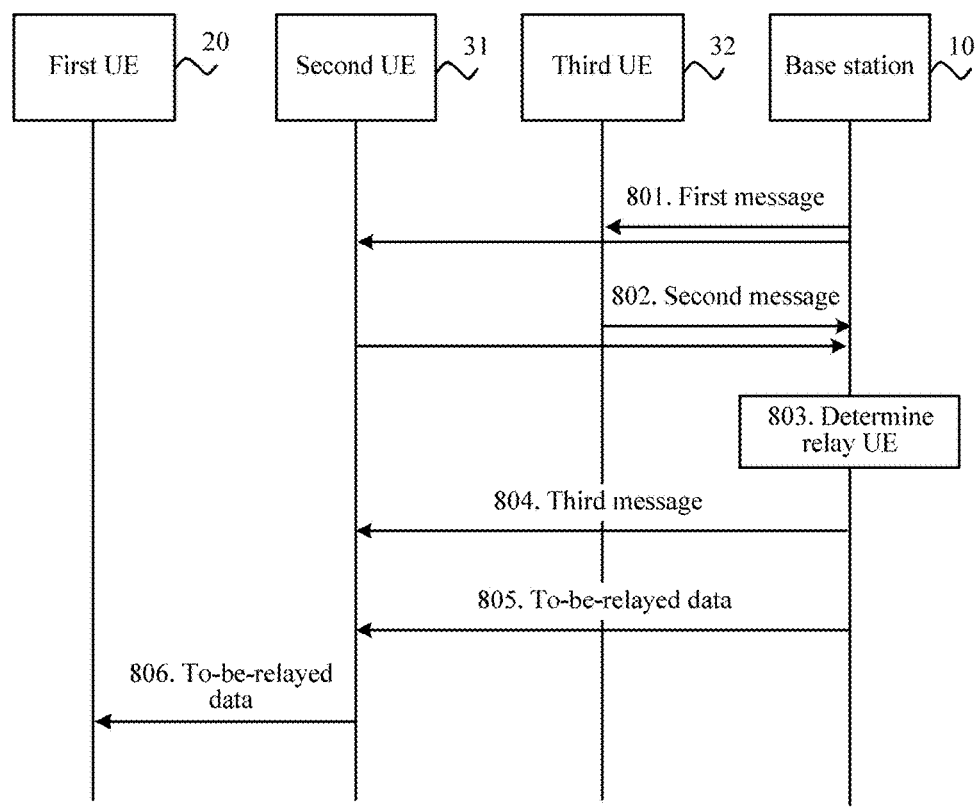
FIG. 8 is an interaction flowchart of a data transmission method according to another embodiment of the present invention.

FIG. 8 is an interaction flowchart of a data transmission method according to another embodiment of the present invention. FIG. 8 shows a base station 10, first UE 20, second UE 31, and third UE 32.

For descriptions about the base station 10, the first UE 20, the second UE 31, and the third UE 32, refer to the descriptions in FIG. 3. To avoid repetition, details are not described herein again.

The method shown in FIG. 8 includes the following steps.

801. The base station 10 sends a first message, where the first message includes relay request information for data transmission between the base station 10 and first UE 20.

Specifically, when the base station 10 needs to send downlink data to the first UE 20, because the first UE 20 is unable to directly perform data transmission with the base station 10, the base station 10 sends the first message. The downlink data that needs to be sent by the base station 10 to the first UE 20 may be referred to as to-be-relayed data.

Herein, a reason why the first UE 20 is unable to perform data transmission with the base station 10 is as follows.

(1) The base station 10 is a serving base station of the first UE 20, but the base station 10 indicates that the first UE 20 needs to perform communication with the base station 10 via relay UE.

(2) The base station 10 is a serving base station of the first UE 20, but the first UE 20 is unable to establish a valid RRC connection to the base station 10.

(3) The first UE 20 is located outside a service range of the base station 10. In other words, the base station 10 is not a serving base station of the first UE 20.

The first message may be sent by the base station 10 by using a downlink cellular link.

Optionally, the base station 10 may send the first message in a broadcast form. In this way, all UEs located in the service range of the base station 10 can receive the first message.

Optionally, the base station 10 may directionally send the first message to multiple UEs near the first UE 20. For example, the base station 10 may first determine the UEs near the first UE 20 according to a history message or the like.

The first message may include at least one of the following: an ID of the base station, a destination address of the to-be-relayed data, or relay resource allocation indication information.

The destination address of the to-be-relayed data may be the first UE 20.

The relay resource allocation indication information is indicated by higher layer signaling and/or physical layer signaling. The physical layer signaling includes DCI, and the DCI is identified by an RNTI related to the relay.

In addition, if one or more intermediate UEs are needed for data transmission between the second UE 31 and the first UE 20 (for example, the related description of the scenario in FIG. 2), the first message may further include a magnitude of a data amount of the to-be-relayed data and/or QoS class information of the to-be-relayed data. In this way, the one or more intermediate UEs may each determine a transmission resource according to the magnitude of the data amount of the to-be-relayed data and/or the QoS class information of the to-be-relayed data.

It may be understood that, when the base station 10 sends the first message, a timer may be started. A specific process is similar to the process in which the timer is started when the first UE 20 sends the first message in the embodiment in FIG. 3. Similarly, refer to the process shown in FIG. 5. To avoid repetition, details are not described herein again.

A reason why the base station 10 fails to relay may be: the first UE 20 is excessively far away from a cell of the base station 10; or if the base station 10 directionally sends the first message to multiple UEs, UE that is selected by the base station 10 and to which the first message is sent is unsuitable (for example, signal quality between the UE and the first UE 20 is excessively poor). In this case, the base station 10 may reselect UE to which the first message needs to be directionally sent, and then retransmit the first message.

802. The second UE 31 and the third UE 32 each send a second message to the base station 10.

Optionally, in another embodiment, 802 may include: after receiving the first message, determining, by each of the second UE 31 and the third UE 32, whether a preset second condition is satisfied; and when determining that the preset second condition is satisfied, send the second message to the base station 10.

It may be understood that, if the second UE 31 can directly perform D2D transmission with the first UE 20, the preset second condition may include: D2D signal quality between the second UE and the first UE is higher than a fourth threshold. Herein, the fourth threshold is predefined, or is configured by the base station.

Optionally, if the first message does not include the relay resource allocation indication information, the second message may include relay resource request information.

Optionally, using the second UE 31 as an example, the second message may further include D2D information about signal quality between the second UE 31 and the first UE 20. Herein, the D2D information about signal quality between the second UE 31 and the first UE 20 may be determined by the second UE 31 according to a history message.

It may be understood that, similar to 302 in the embodiment in FIG. 3, herein, the UE that sends the second message to the base station 10 is referred to as candidate relay UE.

In addition, the second UE 31 and the third UE 32 may determine, by determining whether the preset second condition is satisfied, whether the second UE 31 and the third UE 32 can act as candidate relay UEs.

Optionally, the second UE 31 and the third UE 32 may each send the second message to the base station 10 according to a preset probability.

That is, the second UE 31 and the third UE 32 may determine, by using the preset probability, whether the second UE 31 and the third UE 32 can act as candidate relay UEs.

Specifically, for the description of the preset probability, refer to the description of the 302 in the embodiment in FIG. 3. To avoid repetition, details are not described herein again.

It may be understood that, when the second UE 31 and the third UE 32 each send the second message, the timer may also be started. For a specific process, similarly refer to the process shown in FIG. 6. To avoid repetition, details are not described herein again.

It may be understood that, multiple UEs may send second messages to the base station 10 in 802. Therefore, the base station 10 performs 803.

803. The base station 10 determines relay UE.

It may be understood that, the base station 10 receives second messages sent by at least one UE, and selects one of the at least one UE as the relay UE.

It may be understood that, the base station 10 selects one or more relay UEs from at least one candidate relay UE.

Specifically, the base station 10 may determine the relay UE according to information about signal quality between the at least one UE and the base station 10 and/or information about signal quality between the at least one UE and the first UE 20.

For example, the base station 10 may determine UE as the relay UE, where information about signal quality between the UE and the base station 10 is optimal.

It should be noted that, in this embodiment, the base station 10 may determine one or more relay UEs. That is, the base station 10 may specify one or more UEs of the at least one UE as relay UEs, and this is not limited in the present invention.

Herein, it is assumed that the relay UE determined by the base station 10 is the second UE 31.

804. The base station 10 sends a third message to the second UE 31, where the third message includes indication information instructing the second UE to act as the relay UE for data transmission between the base station 10 and the first UE 20.

That is, the third message instructs the second UE to act as the relay UE for data transmission between the base station and the first UE.

It may be understood that, the base station 10 sends the third message to the relay UE determined in 803. If multiple relay UEs are determined in 803, the base station 10 sends the third message to the multiple relay UEs.

In addition, if the second message includes the relay resource request information, the third message may further include the relay resource allocation indication information.

The relay resource allocation indication information is indicated by higher layer signaling and/or physical layer signaling. The physical layer signaling may include DCI, and the DCI may be identified by an RNTI related to the relay.

Optionally, the base station 10 may further send a fourth message to the third UE 32. The fourth message includes indication information indicating that the third UE 32 cannot act as the relay UE. That is, the fourth message indicates that the third UE 32 cannot act as the relay UE.

Alternatively, the base station 10 may not send any response message to the third UE 32. In this way, if no response from the base station 10 is received within a preset time period, it is considered that the base station 10 does not use the third UE 32 as the relay UE.

805. The base station 10 sends to-be-relayed data to the second UE 31.

Optionally, in this embodiment, 804 and 805 may be performed at the same time. That is, the base station 10 may send the third message and the to-be-relayed data to the second UE 31 at the same time.

In this embodiment of the present invention, the to-be-relayed data sent by the base station 10 may be downlink data generated by the base station 10. Alternatively, the to-be-relayed data may be received by the base station 10 from another UE (for example, the UE 33 in FIG. 4) or from another base station (for example, the base station 101 in FIG. 4). No limitation is set thereto in the present invention.

That is, in this embodiment of the present invention, the base station 10 may be a source address of the to-be-relayed data, or may be an intermediate node in a forwarding path of the to-be-relayed data.

806. The second UE 31 sends the to-be-relayed data to the first UE 20.

Specifically, the second UE 31 sends the to-be-relayed data by using the relay resource allocation indication information that is included in the first message or the third message.

Figure 9:
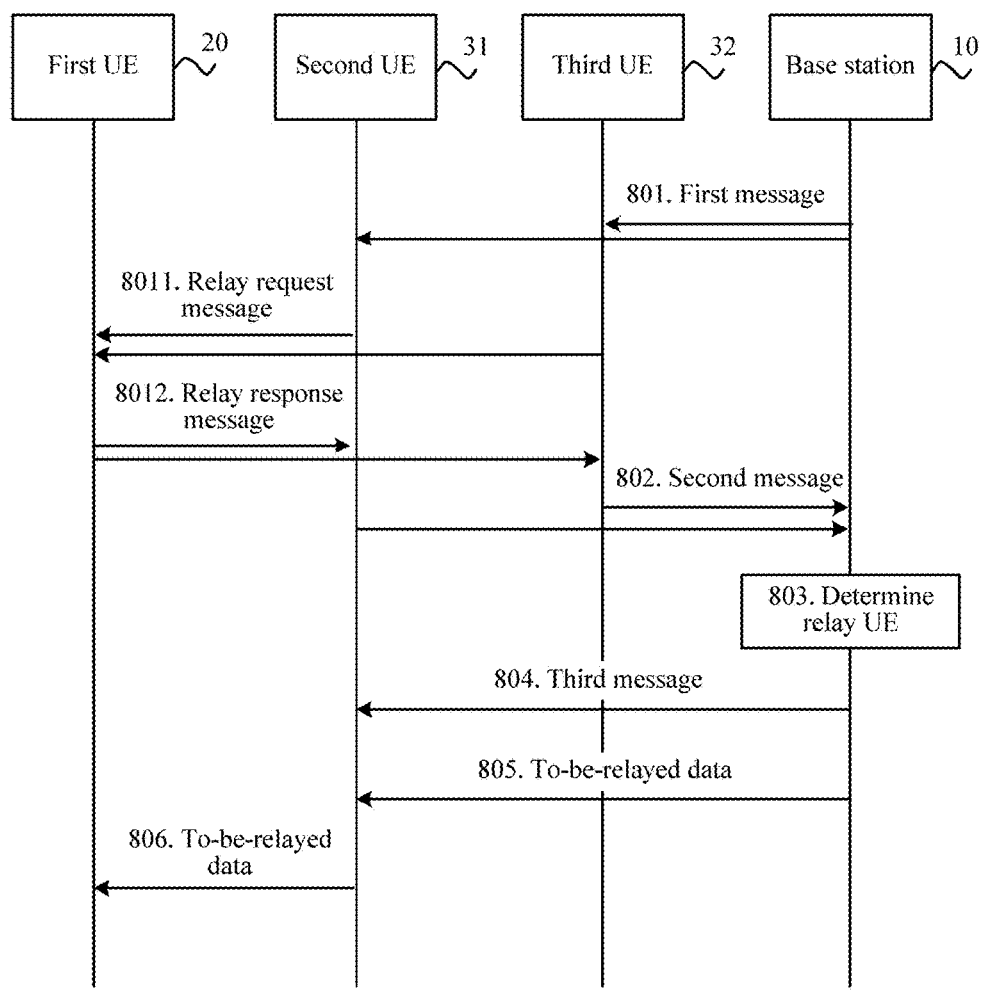
FIG. 9 is an interaction flowchart of a data transmission method according to another embodiment of the present invention.

Alternatively, in another embodiment, as shown in FIG. 9, after 801, the method may further include:

8011. The second UE 31 and the third UE 32 each send relay request information to the first UE 20.

Optionally, the second UE 31 and the third UE 32 may each send the relay request information by using a pre-configured D2D resource pool or a D2D resource pool configured by the base station.

The second UE 31 and the third UE 32 may use a same D2D resource pool or different D2D resource pools.

Using the second UE 31 as an example, the second UE 31 can learn, from the first message, that the destination address of the to-be-relayed data is the first UE 20. Therefore, the relay request information is sent to the first UE 20.

The relay request information may include all or some content in the first message. It should be noted that, even if the first message includes the relay resource allocation indication information, the relay request information does not include the relay resource allocation indication information.

It may be understood that, using the second UE 31 as an example, the second UE 31 may directly send the relay request information to the first UE 20. Alternatively, the second UE 31 may indirectly send the relay request information to the first UE 20 via one or more intermediate UEs.

8012. The second UE 31 and the third UE 32 receive a relay response message sent by the first UE 20.

It may be understood that, further, the second UE 31 and the third UE 31 determine, according to the relay response message, whether the preset second condition is satisfied, and when the preset second condition is satisfied, perform 802, that is, send the second message to the base station 10.

For example, using the second UE 31 as an example, the second UE 31 may determine, according to transmitted quality information of the received relay response message, whether the preset second condition is satisfied.

Correspondingly, it may be understood that, using the second UE 31 as an example, if the second UE 31 can directly perform D2D transmission with the first UE 20, the second message in 802 may further include D2D information about signal quality between the second UE 31 and the first UE 20. Herein, the D2D information about signal quality between the second UE 31 and the first UE 20 may be determined by the second UE 31 according to the relay response message.

It may be understood that, using the second UE 31 as an example, if the second UE 31 performs D2D transmission with the first UE 20 via one or more intermediate UEs, the second UE 31 can obtain information about signal quality of the first UE 20 from the relay response message via the intermediate UE.

Then, further, the preset second condition in 802 may include: signal quality of the first UE 20 is greater than a fifth threshold. The fifth threshold may be preset, or may be pre-configured by the base station 10.

In this embodiment of the present invention, relay UE is determined by a base station, so that efficiency of selecting the relay UE can be improved, a time spent on selecting the relay UE can be shortened, and unnecessary UEs that participate in relay can be reduced. Further, a problem of downlink transmission from the base station to first UE can be resolved.

It can be seen that, for downlink data transmission from a base station to first UE, the method procedure shown in FIG. 8 or FIG. 9 may be used. The base station specifies second UE as relay UE, so that data sent by the base station can be sent to the first UE via the second UE, ensuring data transmission.

Figure 10:
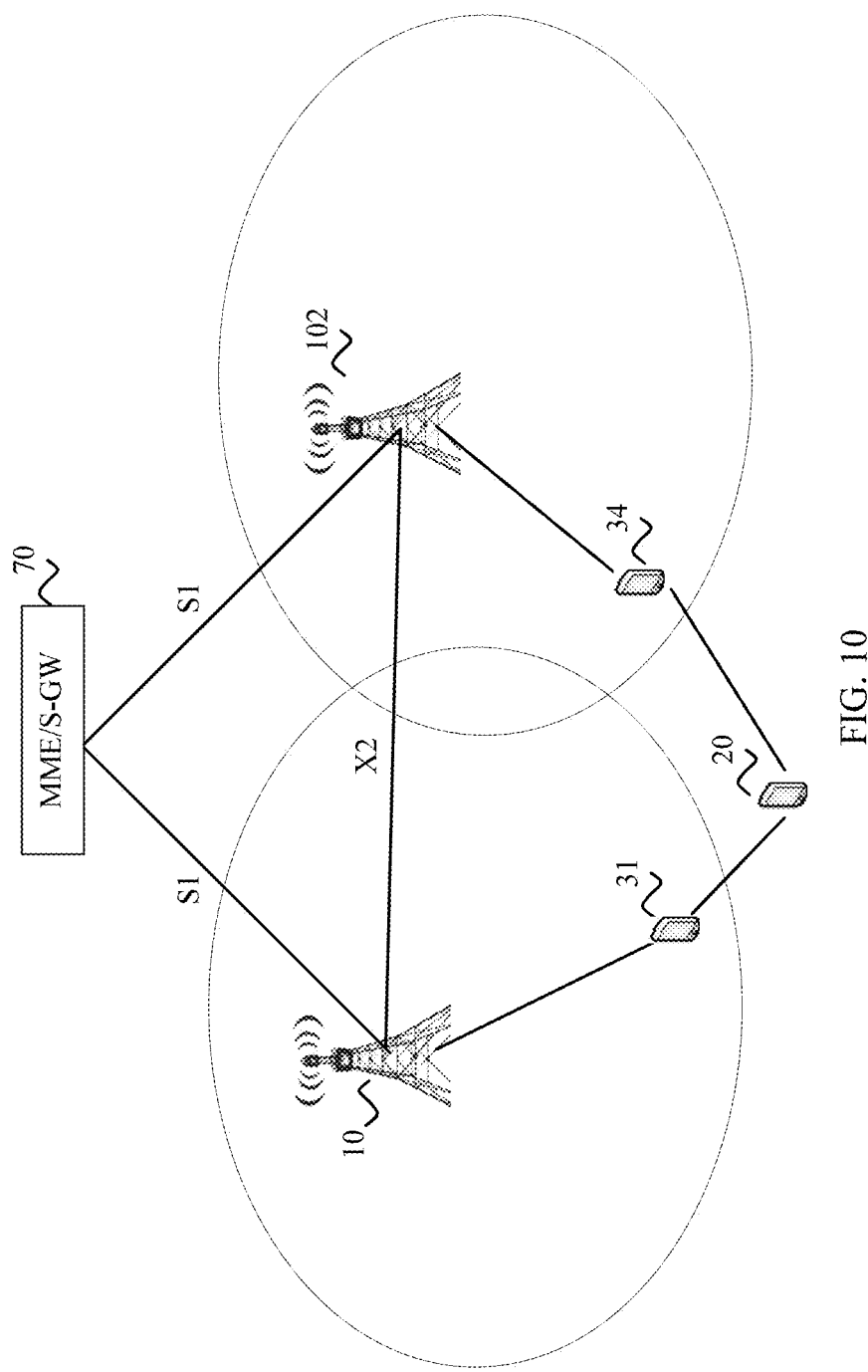
FIG. 10 is a schematic diagram of another application scenario according to an embodiment of the present invention.

It should be noted that, in this embodiment of the present invention, multiple relay UEs may be determined by different base stations. As shown in FIG. 10, a base station 10 may determine second UE 31 as relay UE for first UE 20, and a base station 102 may determine UE 34 as relay UE for the first UE 20.

That is, the UE 31 and the UE 34 are both relay UEs of the first UE 20, but the two relay UEs are served by different base stations. A serving base station of the UE 31 is the base station 10, and a serving base station of the UE 34s is the base station 102. The UE 31 and the UE 34 may be separately located in two adjacent cells.

The base station 10 and the base station 101 may be interconnected by using an X2 interface, and the base station 10 and the base station 101 may both be connected to an MME/S-GW 70 by using an Si interface.

In this way, in this embodiment of the present invention, a base station controls selection of relay UE, so that a current cellular link cannot be affected by introduction of the relay UE, and quality of service of an entire relay link can be ensured.

Figure 11:
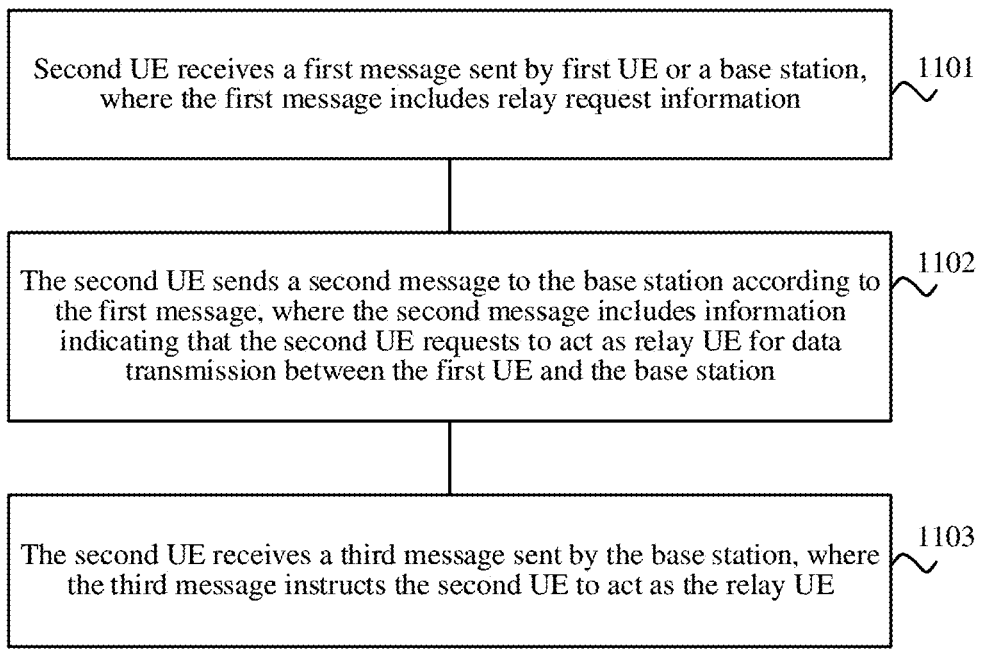
FIG. 11 is a flowchart of a data transmission method according to an embodiment of the present invention.

FIG. 11 is a flowchart of a data transmission method according to an embodiment of the present invention. The method shown in FIG. 10 is performed by second UE, and includes:

The second UE receives a first message sent by first UE or a base station, where the first message includes relay request information.

1102. The second UE sends a second message to the base station according to the first message, where the second message includes information indicating that the second UE requests to act as relay UE for data transmission between the first UE and the base station.

1103. The second UE receives a third message sent by the base station, where the third message instructs the second UE to act as the relay UE.

In the embodiments of the present invention, a base station specifies second UE as relay UE, so that the second UE can assist in data transmission between the base station and first UE. Data transmission efficiency is ensured.

It should be noted that, in this embodiment of the present invention, the base station is a serving base station of the second UE, and the first UE does not directly perform data transmission with the base station.

Optionally, in an embodiment, the relay request information may be indicated by a reference signal and/or a D2D synchronization signal.

That the first UE does not directly perform data transmission with the base station includes: the base station is a serving base station of the first UE, but the base station indicates that the first UE needs to perform communication with the base station via the relay UE; or the base station is a serving base station of the first UE, but a valid radio link control RRC connection is unable to be established between the first UE and the base station; or the first UE does not have a function of performing communication by using a cellular link, and is unable to establish a direct connection to the base station.

Optionally, the first message in 1101 is sent by the first UE by using a D2D link, and the first message further includes at least one of the following: an identity ID of the first UE, network status information of the first UE, a destination address of to-be-relayed data, a magnitude of a data amount of the to-be-relayed data, or quality of service QoS class information of the to-be-relayed data. The to-be-relayed data needs to be sent to the base station.

Correspondingly, 1102 may include: determining, by the second UE according to the first message, whether a preset first condition is satisfied; and when determining that the preset first condition is satisfied, sending the second message to the base station.

The preset first condition includes at least one of the following: the network status information of the first UE indicates that the first UE is unable to directly perform data transmission with the base station, signal quality between the second UE and the base station is lower than a first threshold and higher than a second threshold, or received signal quality at which the second UE receives the first message is higher than a third threshold.

Herein, one or more of the first threshold, the second threshold, or the third threshold is predefined, or configured by using signaling.

Optionally, the sending the second message to the base station may include: sending the second message to the base station according to a preset probability value. The preset probability value is predefined, or is configured by the base station.

Optionally, a method for determining, by the second UE according to the preset probability value, whether to send the second message to the base station may be a method implemented inside the UE. For example, the second UE obtains the preset probability value, for example, 0.25, and then locally generates a random number from 0 to 100 in an equal probability manner. If the generated number is less than or equal to 25, the UE sends the second message; otherwise, the UE does not send the second message.

In this embodiment of the present invention, the second message may include: the ID of the first UE and information about signal quality of the first UE.

If the first message includes the QoS class information of the to-be-relayed data, the second message further includes the QoS class information of the to-be-relayed data.

In addition, if the first message includes the magnitude of the data amount of the to-be-relayed data, the second message may further include relay resource request information, and correspondingly, the third message in 1103 includes relay resource allocation indication information.

The relay resource allocation indication information is indicated by higher layer signaling and/or physical layer signaling. The physical layer signaling includes downlink control information DCI, and the DCI is identified by a radio network temporary identifier RNTI related to the relay.

The relay resource request information is information requesting a resource used for relay, and correspondingly, the relay resource allocation indication information is information indicating relay resource allocation.

Optionally, at a time of the sending the second message to the base station, the second UE may start a timer. Correspondingly, 1103 may include: receiving, by the second UE within duration that is set by the timer, the third message sent by the base station.

Optionally, after 1103, the method may further include: sending, by the second UE, a fourth message to the first UE, where the fourth message indicates that the second UE acts as the relay UE, and the fourth message is a response message to the first message.

After 1103, the method may further include: receiving, by the second UE, the to-be-relayed data sent by the first UE; and sending, by the second UE, the to-be-relayed data to the base station.

In this way, the second UE can act as the relay UE to assist in data transmission from the first UE to the base station.

Optionally, the first message in 1101 is sent by the base station by using a downlink cellular link. The first message further includes at least one of the following: an ID of the base station, the destination address of the to-be-relayed data, or the relay resource allocation indication information. The destination address of the to-be-relayed data is the first UE.

The relay resource allocation indication information is indicated by higher layer signaling and/or physical layer signaling. The physical layer signaling may include downlink control information DCI, and the DCI is identified by a radio network temporary identifier RNTI related to the relay.

1102 may include: determining, by the second UE according to the first message, whether a preset second condition is satisfied; and when determining that the preset second condition is satisfied, sending the second message to the base station.

The preset second condition includes: D2D signal quality between the second UE and the first UE is higher than a fourth threshold. Herein, the fourth threshold is predefined, or is configured by the base station.

1102 may include: sending, by the second UE, relay request information to the first UE by using a D2D link; receiving, by the second UE, a relay response message sent by the first UE; determining, by the second UE according to the relay response message, whether the preset second condition is satisfied; and when determining that the preset second condition is satisfied, sending the second message to the base station.

The relay request information includes at least one of the following: the ID of the base station, the ID of the first UE, the magnitude of the data amount of the to-be-relayed data, or the QoS class information of the to-be-relayed data.

Correspondingly, the second message includes: information about D2D signal quality between the second UE and the first UE.

Optionally, if the second UE performs transmission with the first UE via one or more intermediate UEs, the second UE can obtain information about signal quality of the first UE from the relay response message. Correspondingly, the second message may include: the information about the signal quality of the first UE. The preset second condition may also be: the information about the signal quality of the first UE is greater than a fifth threshold.

Optionally, the third message further includes the to-be-relayed data, and the method further includes: sending, by the second UE, the to-be-relayed data to the first UE.

Alternatively, optionally, the method further includes: receiving, by the second UE, the to-be-relayed data sent by the base station; and sending, by the second UE, the to-be-relayed data to the first UE.

In this way, in this embodiment of the present invention, a base station specifies second UE as relay UE, so that the second UE can assist in data transmission between the base station and first UE, thereby improving data transmission efficiency.

It should be noted that, for a process executed by the second UE in FIG. 11, refer to the process executed by the second UE 31 in FIG. 3 or FIG. 8 or FIG. 9. To avoid repetition, details are not described herein again.

Figure 12:
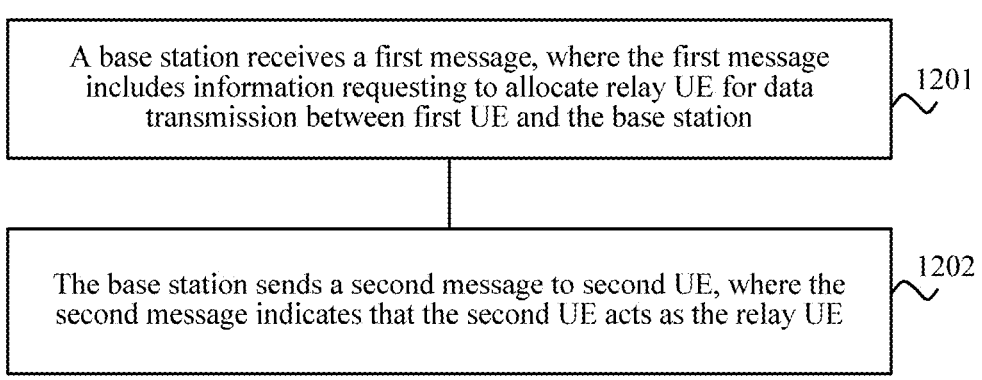
FIG. 12 is a flowchart of a data transmission method according to another embodiment of the present invention.

FIG. 12 is a flowchart of a data transmission method according to another embodiment of the present invention. The method shown in FIG. 12 is performed by a base station, and includes:

1201. The base station receives a first message, where the first message includes information requesting to allocate relay UE for data transmission between first UE and the base station.

1202. The base station sends a second message to second UE, where the second message indicates that the second UE acts as the relay UE In this embodiment of the present invention, the base station specifies the second UE as the relay UE according to the received first message, to assist in the data transmission between the first UE and the base station.

Optionally, in an embodiment, 1201 includes: receiving, by the base station, the first message from the second UE. The first message includes at least one of the following: an ID of the first UE, information about signal quality of the first UE, a magnitude of a data amount of to-be-relayed data of the first UE, or QoS class information of the to-be-relayed data, relay resource request information, or an ID of the base station.

Optionally, if the first message includes the relay resource request information, the second message in 1202 includes relay resource allocation indication information. The relay resource allocation indication information is indicated by higher layer signaling and/or physical layer signaling. The physical layer signaling includes downlink control information DCI, and the DCI is identified by a radio network temporary identifier RNTI related to the relay.

Optionally, 1201 may include: receiving, by the base station, the first message from at least one UE, where the at least one UE includes the second UE but does not include the first UE. After 1201 and before 1202, the method further includes: determining, by the base station, the second UE in the at least one UE as the relay UE according to at least one of the following information: information about signal quality between the second UE and the base station, or information about signal quality between the second UE and the first UE.

It may be understood that, in this embodiment, for the first message in 1201, refer to the description of the second message in FIG. 3. For the second message in 1202, refer to the description of the third message in FIG. 3. To avoid repetition, details are not described herein again.

Optionally, before or after 1202, or at the same time when 1202 is performed, the method may further include: sending, by the base station, a third message to third UE in the at least one UE, where the third message includes indication information indicating that the third UE cannot act as the relay UE of the first UE.

It should be noted that, in this embodiment, for a process executed by the base station in FIG. 12, refer to the process executed by the base station 10 in FIG. 3. To avoid repetition, details are not described herein again.

Optionally, in another embodiment, 1201 may include: receiving, by the base station, the first message from the first UE. The first message includes at least one of the following: an identity ID of the first UE, a destination address of to-be-relayed data, a magnitude of a data amount of the to-be-relayed data, or quality of service QoS class information of the to-be-relayed data.

It may be understood that, if the first message includes the magnitude of the data amount of the to-be-relayed data and/or the QoS class information of the to-be-relayed data, the second message in 1202 includes relay resource allocation indication information. The relay resource allocation indication information is indicated by higher layer signaling and/or physical layer signaling. The physical layer signaling includes DCI, and the DCI is identified by an RNTI related to the relay.

It may be understood that, in this embodiment, for the first message in 1201, refer to the description of the first message in FIG. 7. For the second message in 1202, refer to the description of the third message in FIG. 7. That is, for 1201 in this embodiment, refer to 701 in FIG. 7. For 1202, refer to 703 in FIG. 7. To avoid repetition, details are not described herein again.

It should be noted that, in this embodiment, for a process executed by the base station in FIG. 12, refer to the process executed by the base station 10 in FIG. 7. To avoid repetition, details are not described herein again.

In this way, after the method shown in FIG. 12, the method may further include: receiving, by the base station, the to-be-relayed data sent by the second UE, where the to-be-relayed data is sent by the first UE to the second UE. That is, the second UE acts as the relay UE to forward, to the base station, the data sent by the first UE.

Figure 13:
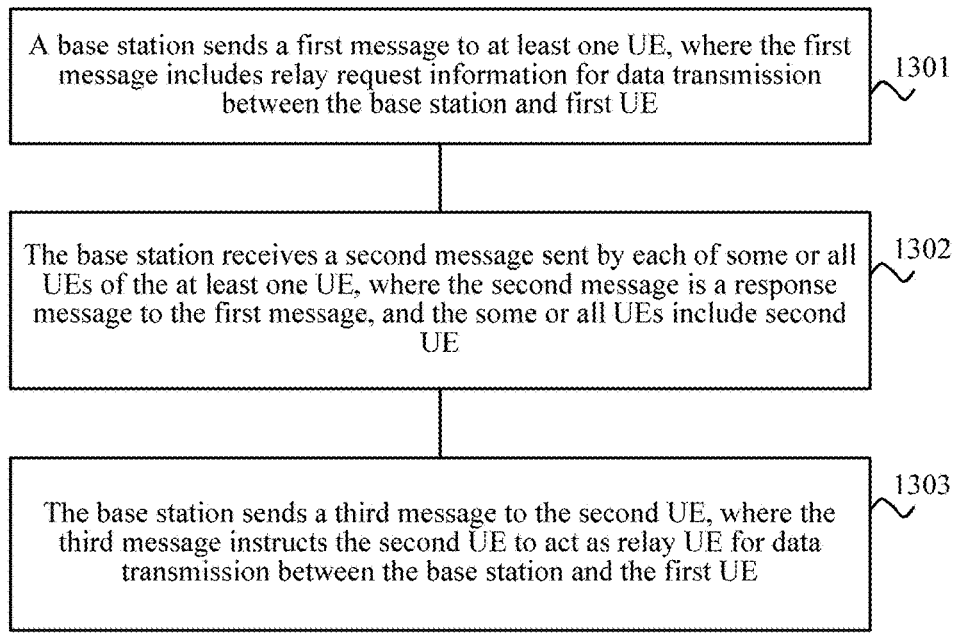
FIG. 13 is a flowchart of a data transmission method according to another embodiment of the present invention.

FIG. 13 is a flowchart of a data transmission method according to another embodiment of the present invention. The method shown in FIG. 13 is performed by a base station, and includes the following steps.

1301. The base station sends a first message to at least one UE, where the first message includes relay request information for data transmission between the base station and first UE.

1302. The base station receives a second message sent by each of some or all UEs of the at least one UE, where the second message is a response message to the first message, and the some or all UEs include second UE.

1303. The base station sends a third message to the second UE, where the third message instructs the second UE to act as relay UE for data transmission between the base station and the first UE.

In this embodiment of the present invention, when relay needs to be performed when a base station sends data to first UE, the base station specifies second UE as relay UE. In this way, the base station can transmit to-be-relayed data to the first UE via the second UE, ensuring data transmission.

Optionally, 1301 includes: when the base station is unable to directly perform data transmission with the first UE, sending, by the base station, the first message to at least one UE.

That the base station is unable to directly perform data transmission with the first UE includes:

the base station is a serving base station of the first UE, but the base station indicates that the first UE needs to perform communication with the base station via the relay UE; or the base station is a serving base station of the first UE, but a valid radio link control RRC connection is unable to be established between the first UE and the base station; or the first UE does not have a function of performing communication by using a cellular link, and is unable to establish a direct connection to the base station.

The first message is sent by the base station by using a downlink cellular link.

Optionally, the first message is sent by the base station in a broadcast form. That is, in 1201, the base station sends the first message in the broadcast form. In this way, all UEs located in a service range of the base station can receive the first message.

Optionally, in 1301, the base station may send the first message to at least one particular UE. For example, the first message is send to at least one UE near the first UE.

The first message further includes at least one of the following: an ID of the base station, a destination address of the to-be-relayed data, or relay resource allocation indication information. The destination address of the to-be-relayed data is the first UE.

Optionally, before 1303, the method may further include: determining, by the base station, the second UE of the some or all UEs as the relay UE according to at least one of the following information: information about signal quality between the second UE and the base station, or information about signal quality between the second UE and the first UE.

The second message may include: information about signal quality of the first UE.

Optionally, if the first message does not include the relay resource allocation indication information, the second message may include relay resource request information, and the third message includes the relay resource allocation indication information. The relay resource allocation indication information is indicated by higher layer signaling and/or physical layer signaling. The physical layer signaling includes DCI, and the DCI is identified by an RNTI related to the relay.

Optionally, before or after 1303, or at the same time when 1303 is performed, the method may further include: sending, by the base station, a fourth message to third UE of the some UEs or all the UEs, where the fourth message indication information indicating that the third UE cannot act as the relay UE of the first UE. That is, the fourth message indicates that the third UE 32 cannot act as the relay UE.

Further, after 804, the method may further include: sending, by the base station, the to-be-relayed data to the second UE, so that the second UE sends the to-be-relayed data to the first UE.

It should be noted that, for a process executed by the base station in FIG. 13, refer to the process executed by the base station 10 in FIG. 8 or FIG. 9. To avoid repetition, details are not described herein again.

Figure 14:
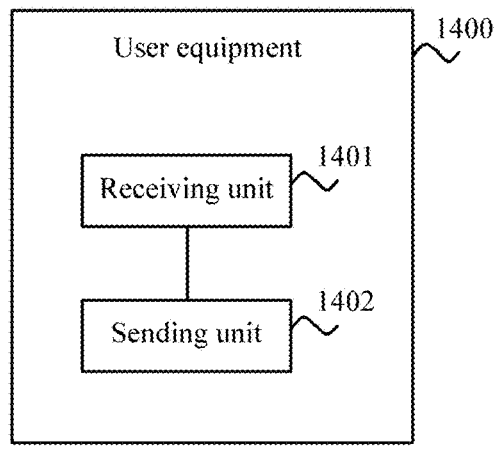
FIG. 14 is a structural block diagram of user equipment according to an embodiment of the present invention.

FIG. 14 is a structural block diagram of user equipment according to an embodiment of the present invention. The user equipment 1400 shown in FIG. 14 is second UE and includes a receiving unit 1401 and a sending unit 1402.

The receiving unit 1401 is configured to receive a first message sent by first UE or a base station, where the first message includes relay request information.

The sending unit 1402 is configured to send a second message to the base station according to the first message received by the receiving unit 1401, where the second message includes information indicating that the second UE requests to act as relay UE for data transmission between the first UE and the base station.

The receiving unit 1401 is further configured to receive a third message sent by the base station, where the third message instructs the second UE to act as the relay UE.

In the embodiments of the present invention, a base station specifies second UE as relay UE, so that the second UE can assist in data transmission between the base station and first UE. Data transmission efficiency is ensured.

It should be noted that, in this embodiment of the present invention, the base station is a serving base station of the second UE, and the first UE does not directly perform data transmission with the base station.

Optionally, in an embodiment, the relay request information may be indicated by a reference signal and/or a D2D synchronization signal.

Optionally, in an embodiment, the first message is sent by the first UE by using a device-to-device D2D link, and the first message further includes at least one of the following: an identity ID of the first UE, network status information of the first UE, a destination address of to-be-relayed data, a magnitude of a data amount of the to-be-relayed data, or quality of service QoS class information of the to-be-relayed data.

The to-be-relayed data needs to be sent to the base station.

Figure 15:
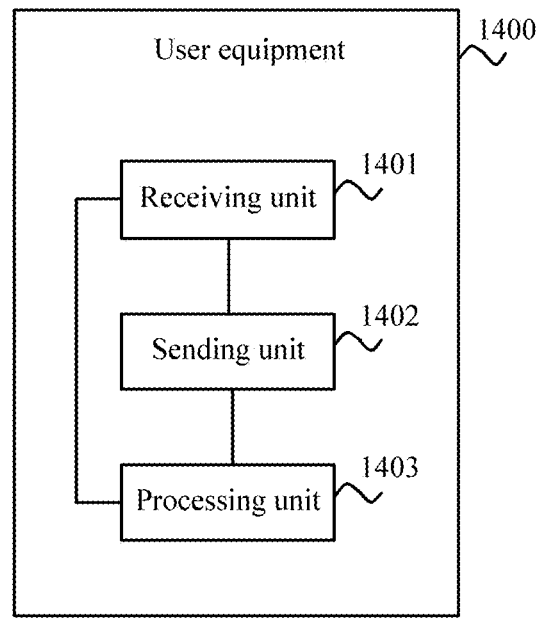
FIG. 15 is a structural block diagram of user equipment according to another embodiment of the present invention.

Optionally, as shown in FIG. 15, the user equipment 1400 may further include a processing unit 1403.

The processing unit 1403 is configured to determine, according to the first message, whether a preset first condition is satisfied.

The sending unit 1402 is specifically configured to: when the processing unit 1403 determines that the preset first condition is satisfied, send the second message to the base station.

The preset first condition includes at least one of the following: the network status information of the first UE indicates that the first UE is unable to directly perform data transmission with the base station, signal quality between the second UE and the base station is lower than a first threshold and higher than a second threshold, or received signal quality at which the second UE receives the first message is higher than a third threshold.

One or more of the first threshold, the second threshold, or the third threshold is predefined, or configured by using signaling.

Optionally, the sending unit 1402 is specifically configured to send the second message to the base station according to a preset probability value. The preset probability value is predefined, or is configured by the base station.

Optionally, the second message further includes: the ID of the first UE and information about signal quality of the first UE. If the first message includes the QoS class information of the to-be-relayed data, the second message further includes the QoS class information of the to-be-relayed data.

Optionally, the first message includes the magnitude of the data amount of the to-be-relayed data, the second message includes relay resource request information, and the third message includes relay resource allocation indication information.

The relay resource allocation indication information is indicated by higher layer signaling and/or physical layer signaling.

The physical layer signaling includes downlink control information DCI, and the DCI is identified by a radio network temporary identifier RNTI related to the relay.

Optionally, the sending unit 1402 is further configured to send a fourth message to the first UE.

The fourth message indicates that the second UE acts as the relay UE, and the fourth message is a response message to the first message.

Optionally, in another embodiment, the first message is sent by the base station by using a downlink cellular link, and the first message further includes at least one of the following: an identity ID of the base station, a destination address of the to-be-relayed data, or relay resource allocation indication information, where the destination address of the to-be-relayed data is the first UE.

The relay resource allocation indication information is indicated by higher layer signaling and/or physical layer signaling. The physical layer signaling includes DCI, and the DCI is identified by an RNTI related to the relay.

Optionally, the sending unit 1402 is further configured to send the relay request information to the first UE by using a device-to-device D2D link. The receiving unit 1401 is further configured to receive a relay response message sent by the first UE.

Optionally, the second message further includes: information about signal quality of the first UE.

Optionally, the processing unit 1403 is configured to determine, according to the first message, whether a preset second condition is satisfied. The sending unit 1402 is specifically configured to: when the processing unit 1403 determines that the preset second condition is satisfied, send the second message to the base station.

The preset second condition includes: device-to-device D2D signal quality between the second UE and the first UE is higher than a fourth threshold, and the fourth threshold is predefined, or is configured by the base station.

Optionally, the processing unit 1403 is configured to: when the sending unit 1402 sends the second message, start a timer. The receiving unit 1401 is specifically configured to: receive, within duration that is set by the timer of the processing unit 1403, the third message sent by the base station.

Optionally, in another embodiment, the base station is a serving base station of the second UE, and the base station does not directly perform data transmission with the first UE.

That the first UE does not directly perform data transmission with the base station includes: the base station is a serving base station of the first UE, but the base station indicates that the first UE needs to perform communication with the base station via the relay UE; or the base station is a serving base station of the first UE, but a valid radio link control RRC connection is unable to be established between the first UE and the base station; or the first UE does not have a function of performing communication by using a cellular link, and is unable to establish a direct connection to the base station.

The user equipment 1400 in FIG. 14 or FIG. 15 can implement the processes executed by the second UE in the embodiments of FIG. 3, FIG. 8, FIG. 9, and FIG. 11. To avoid repetition, details are not described herein again.

Figure 16:
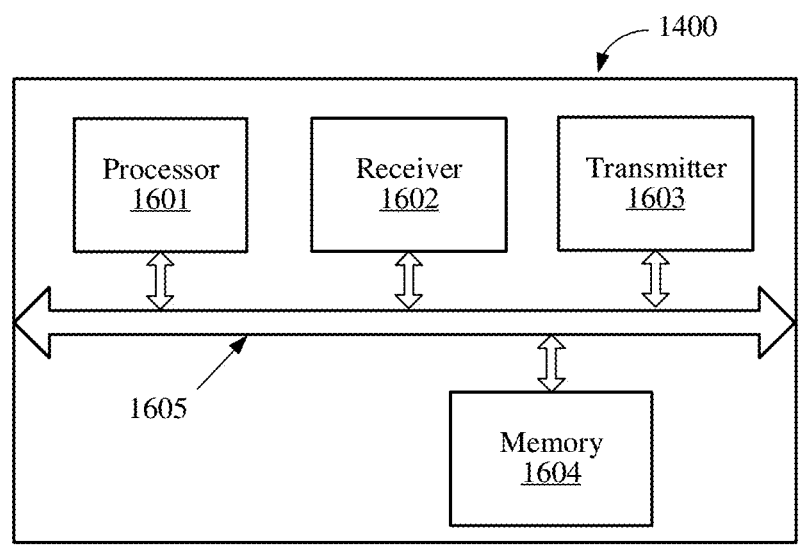
FIG. 16 is a structural block diagram of user equipment according to another embodiment of the present invention.

It should be noted that, in this embodiment of the present invention, the receiving unit 1401 may be implemented by using a receiver, the sending unit 1402 may be implemented by using a transmitter, and the processing unit 1403 may be implemented by using a processor. As shown in FIG. 16, user equipment 1400 may include a processor 1601, a receiver 1602, a transmitter 1603, and a memory 1604. The memory 1604 may be configured to store code or the like executed by the processor 1601.

Components in the user equipment 1400 are coupled by using a bus system 1605. The bus system 1605 further includes a power supply bus, a control bus, and a status signal bus in addition to a data bus.

Figure 17:
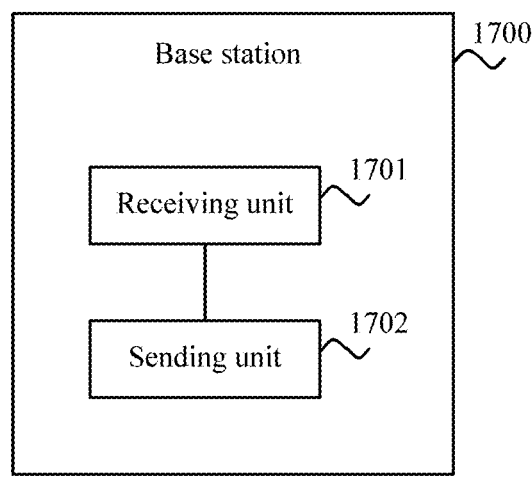
FIG. 17 is a structural block diagram of a base station according to an embodiment of the present invention.

FIG. 17 is a structural block diagram of a base station according to an embodiment of the present invention. The base station 1700 shown in FIG. 17 includes a receiving unit 1701 and a sending unit 1702.

The receiving unit 1701 is configured to receive a first message, where the first message includes information requesting to allocate relay UE for data transmission between first UE and the base station.

The sending unit 1702 is configured to send a second message to second UE, where the second message indicates that the second UE acts as the relay UE.

In this embodiment of the present invention, the base station specifies, from multiple UEs that each send the first message, the second UE as the relay UE, to assist in the data transmission between the first UE and the base station.

Optionally, in an embodiment, the receiving unit 1701 is specifically configured to receive the first message from the second UE. The first message includes at least one of the following: an identity ID of the first UE, information about signal quality of the first UE, a magnitude of a data amount of to-be-relayed data of the first UE, or quality of service QoS class information of the to-be-relayed data, relay resource request information, or an ID of the base station.

Optionally, the first message includes the relay resource request information, and the second message includes relay resource allocation indication information. The relay resource allocation indication information is indicated by higher layer signaling and/or physical layer signaling. The physical layer signaling includes downlink control information DCI, and the DCI is identified by a radio network temporary identifier RNTI related to the relay.

Figure 18:
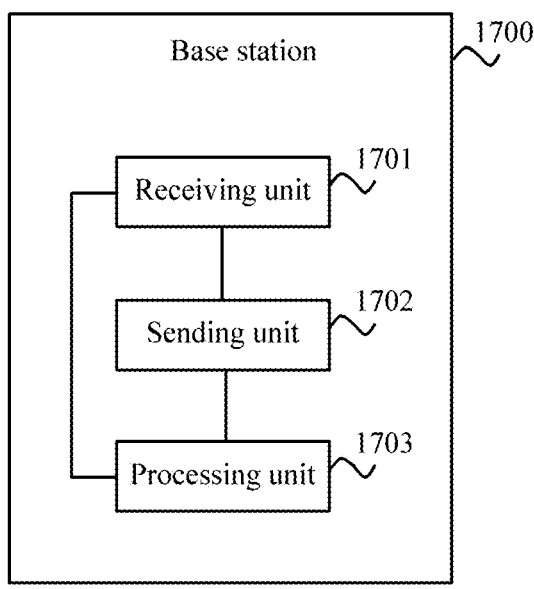
FIG. 18 is a structural block diagram of a base station according to another embodiment of the present invention.

Optionally, as shown in FIG. 18, the base station 1700 may further include a processing unit 1703. The receiving unit 1701 is specifically configured to receive the first message from at least one UE, where the at least one UE includes the second UE but does not include the first UE. The processing unit 1703 is configured to determine the second UE in the at least one UE as the relay UE according to at least one of the following information: information about signal quality between the second UE and the base station, or information about signal quality between the second UE and the first UE.

Optionally, the sending unit 1702 is further configured to: send a third message to third UE in the at least one UE, where the third message indicates that the third UE cannot act as the relay UE.

Optionally, in another embodiment, the receiving unit 1701 is specifically configured to receive the first message from the first UE.

The first message includes at least one of the following: an identity ID of the first UE, a destination address of to-be-relayed data, a magnitude of a data amount of the to-be-relayed data, or quality of service QoS class information of the to-be-relayed data.

Optionally, in this embodiment of the present invention, the first message includes the magnitude of the data amount of the to-be-relayed data and/or the QoS class information of the to-be-relayed data, and the second message includes relay resource allocation indication information.

The relay resource allocation indication information is indicated by higher layer signaling and/or physical layer signaling. The physical layer signaling includes downlink control information DCI, and the DCI is identified by a radio network temporary identifier RNTI related to the relay.

The base station 1700 in FIG. 17 or FIG. 18 can implement the processes executed by the base station in the embodiments of FIG. 3, FIG. 7, and FIG. 12. To avoid repetition, details are not described herein again.

Figure 19:
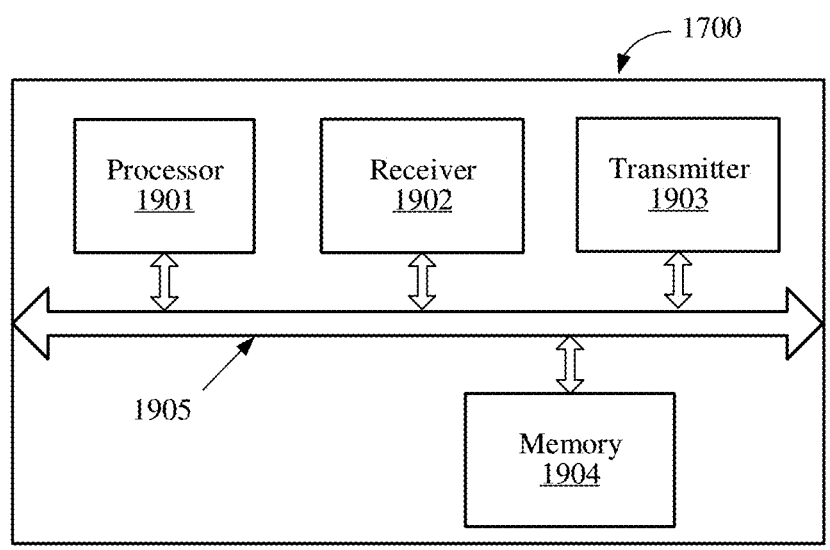
FIG. 19 is a structural block diagram of a base station according to another embodiment of the present invention.

It should be noted that, in this embodiment of the present invention, the receiving unit 1701 may be implemented by using a receiver, the sending unit 1702 may be implemented by using a transmitter, and the processing unit 1703 may be implemented by using a processor. As shown in FIG. 19, a base station 1700 may include a processor 1901, a receiver 1902, a transmitter 1903, and a memory 1904. The memory 1904 may be configured to store code or the like executed by the processor 1901.

Components in the base station 1700 are coupled by using a bus system 1905. The bus system 1905 further includes a power supply bus, a control bus, and a status signal bus in addition to a data bus.

Figure 20:
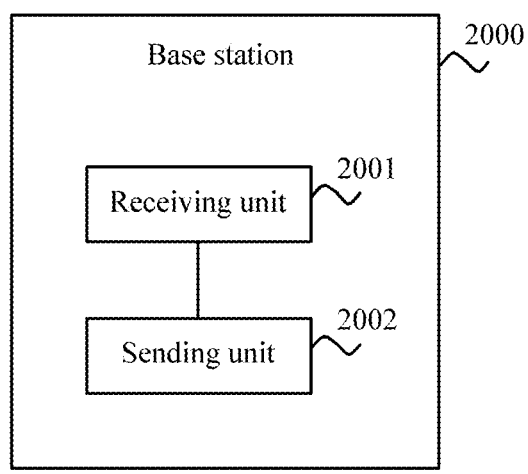
FIG. 20 is a structural block diagram of a base station according to another embodiment of the present invention.

FIG. 20 is a structural block diagram of a base station according to another embodiment of the present invention. The base station 2000 shown in FIG. 20 includes a sending unit 2001 and a receiving unit 2002.

The sending unit 2001 is configured to send a first message to at least one user equipment UE, where the first message includes relay request information for data transmission between the base station and first UE.

The receiving unit 2002 is configured to receive a second message sent by each of some or all UEs of the at least one UE, where the second message is a response message to the first message, and the some or all UEs include second UE.

The sending unit 2001 is further configured to send a third message to the second UE, where the third message instructs the second UE to act as relay UE for data transmission between the base station and the first UE.

In this embodiment of the present invention, the base station specifies the second UE as relay UE, so that the relay UE can assist the base station in sending relay data in the base station to the remote first UE.

Optionally, in this embodiment of the present invention, the first message is sent by the base station by using a downlink cellular link, and the first message further includes at least one of the following: an identity ID of the base station, a destination address of the to-be-relayed data, or relay resource allocation indication information, where the destination address of the to-be-relayed data is the first UE.

Figure 21:
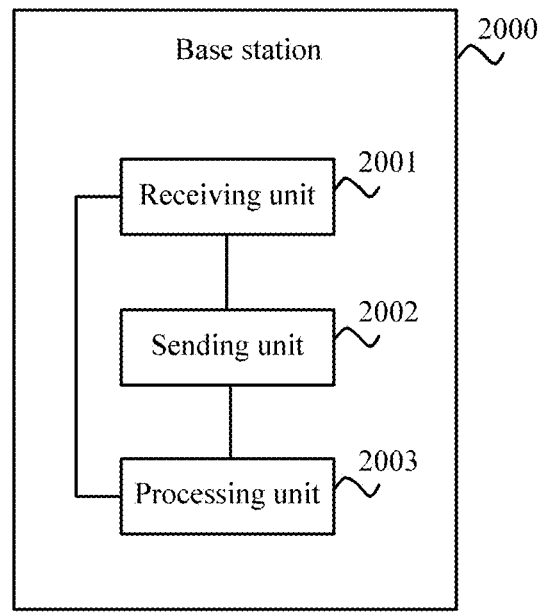
FIG. 21 is a structural block diagram of a base station according to another embodiment of the present invention.

Optionally, in an embodiment, as shown in FIG. 21, the base station 2000 may further include a processing unit 2003. The processing unit 2003 is configured to determine the second UE of the some or all UEs as the relay UE according to at least one of the following information: information about signal quality between the second UE and the base station, or information about signal quality between the second UE and the first UE.

Optionally, in another embodiment, the second message includes relay resource request information, and the third message includes the relay resource allocation indication information.

The relay resource allocation indication information is indicated by higher layer signaling and/or physical layer signaling.

The physical layer signaling includes DCI, and the DCI is identified by an RNTI related to the relay.

Optionally, in another embodiment, the sends unit 2002 is further configured to: send a fourth message to third UE of the some UEs or all the UEs, where the fourth message indicates that the third UE cannot act as the relay UE.

Optionally, in another embodiment, the base station is a serving base station of the second UE, and the base station does not directly perform data transmission with the first UE.

That the base station does not directly perform data transmission with the first UE includes: the base station is a serving base station of the first UE, but the base station indicates that the first UE needs to perform communication with the base station via the relay UE; or the base station is a serving base station of the first UE, but a valid radio link control RRC connection is unable to be established between the first UE and the base station; or the first UE does not have a function of performing communication by using a cellular link, and is unable to establish a direct connection to the base station.

The base station 2000 in FIG. 20 or FIG. 21 can implement the processes executed by the base station in the embodiments of FIG. 8, FIG. 9, and FIG. 13. To avoid repetition, details are not described herein again.

Figure 22:
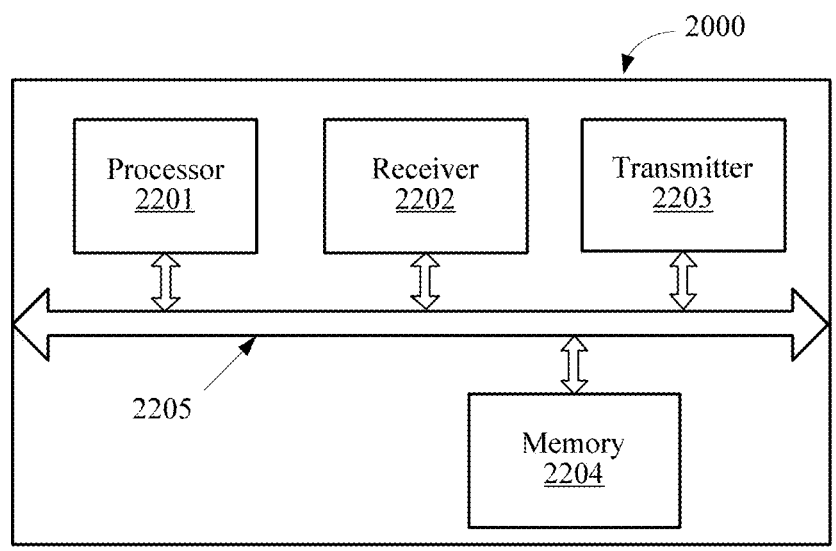
FIG. 22 is a structural block diagram of a base station according to another embodiment of the present invention.

It should be noted that, in this embodiment of the present invention, the receiving unit 2001 may be implemented by using a receiver, the sends unit 2002 may be implemented by using a transmitter, and the processing unit 2003 may be implemented by using a processor. As shown in FIG. 22, a base station 2000 may include a processor 2201, a receiver 2202, a transmitter 2203, and a memory 2204. The memory 2204 may be configured to store code or the like executed by the processor 2201.

Components in the device 2000 are coupled by using a bus system 2205. The bus system 2205 further includes a power supply bus, a control bus, and a status signal bus in addition to a data bus.

It should be noted that, the foregoing method embodiments of the present invention may be applied to a processor, or implemented by the processor. The processor may be an integrated circuit chip and has a signal processing capability. In an implementation process, each step of the foregoing method embodiments may be implemented by using a hardware integrated logic circuit in the processor or by an instruction in a software form. The processor may be a general-purpose processor, a digital signal processor (DSP), an application-specific integrated circuit (ASIC), a field programmable gate array (FPGA), or another programmable logical device, discrete gate or transistor logic device, or discrete hardware component. The processor may implement or execute methods, steps and logical block diagrams disclosed in the embodiments of the present invention. The general purpose processor may be a microprocessor or the processor may be any conventional processor or the like. Steps of the methods disclosed with reference to the embodiments of the present invention may be directly executed and completed by a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps of the foregoing methods in combination with hardware of the processor.

It may be understood that, the memory in the embodiments of the present invention may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. RAMs in many forms such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM) may be used, which is an example rather than limitative description. It should be noted that, the memory in the system and method described in this specification intends to include, but is not limited to, these memories and any other memory of a suitable type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
  receiving, by second user equipment (UE), a first message from first UE, wherein the first message comprises relay request information;
  determining, by the second UE according to the first message, whether a preset first condition is satisfied, wherein the preset first condition comprises: network status information of the first UE indicating that the first UE is unable to directly perform data transmission with a base station, or signal quality between the second UE and the base station being lower than a first threshold and higher than a second threshold;
  when determining that the preset first condition is satisfied, sending, by the second UE, a second message to the base station according to the first message, wherein the second message comprises information indicating that the second UE requests to act as relay UE for data transmission between the first UE and the base station; and
  receiving, by the second UE, a third message from the base station, wherein the third message instructs the second UE to act as the relay UE.

2. The method according to claim 1, wherein the first message is received from the first UE by using a device-to-device (D2D) link, and the first message further comprises:
  an identity (ID) of the first UE, the network status information of the first UE, a destination address of to-be-relayed data, a magnitude of a data amount of the to-be-relayed data, or quality of service (QoS) class information of the to-be-relayed data, and
  wherein the to-be-relayed data needs to be sent to the base station.

3. The method according to claim 2, wherein the second message further comprises: the ID of the first UE and information about signal quality of the first UE; and
  when the first message comprises the QoS class information of the to-be-relayed data, the second message further comprises the QoS class information of the to-be-relayed data.

4. An apparatus comprising:
a receiving circuit, configured to receive a first message from UE, wherein the first message comprises relay request information;
a processor, configured to determine, according to the first message, whether a preset first condition is satisfied, wherein the preset first condition comprises: network status information of the UE indicating that the UE is unable to directly perform data transmission with a base station, or signal quality between the apparatus and the base station being lower than a first threshold and higher than a second threshold; and
a sending circuit, configured to, when the processor determines that the preset first condition is satisfied, send a second message to the base station according to the first message received by the receiving circuit, wherein the second message comprises information indicating that the apparatus requests to act as a relay UE for data transmission between the UE and the base station;
wherein the receiving circuit is further configured to receive a third message from the base station, wherein the third message instructs the apparatus to act as the relay UE.

5. The apparatus according to claim 4, wherein the message is received from the UE by using a device-to-device (D2D) link, and the message further comprises:
an identity (ID) of the UE, the network status information of the UE, a destination address of to-be-relayed data, a magnitude of a data amount of the to-be-relayed data, or quality of service (QoS) class information of the to-be-relayed data, wherein the to-be-relayed data needs to be sent to the base station.

6. The apparatus according to claim 5, wherein the second message further comprises: the ID of the UE and information about signal quality of the UE; and
wherein, when the first message comprises the QoS class information of the to-be-relayed data, the second message further comprises the QoS class information of the to-be-relayed data.

7. A non-transitory computer readable storage medium storing a plurality of instructions, wherein the plurality of instructions is configured to, when executed by a processor, cause a second user equipment (UE) to:
receive a first message from first UE, wherein the first message comprises relay request information;
determine, according to the first message, whether a preset first condition is satisfied, wherein the preset first condition comprises: network status information of the first UE indicating that the first UE is unable to directly perform data transmission with a base station, or signal quality between the second UE and the base station being lower than a first threshold and higher than a second threshold;
when determining that the preset first condition is satisfied, send a second message to the base station according to the first message, wherein the second message comprises information indicating that the second UE requests to act as relay UE for data transmission between the first UE and the base station; and
receive a third message from the base station, wherein the third message instructs the second UE to act as the relay UE.

8. The non-transitory computer readable storage medium according to claim 7, wherein the first message is received from the first UE using a device-to-device (D2D) link, and the first message further comprises:
an identity (ID) of the first UE, the network status information of the first UE, a destination address of to-be-relayed data, a magnitude of a data amount of the to-be-relayed data, or quality of service (QoS) class information of the to-be-relayed data, and
wherein the to-be-relayed data needs to be sent to the base station.

9. The non-transitory computer readable storage medium according to claim 7, wherein the preset first condition comprises the network status information of the first UE indicating that the first UE is unable to directly perform data transmission with the base station.

10. The non-transitory computer readable storage medium according to claim 7, wherein the preset first condition comprises the signal quality between the second UE and a base station being lower than the first threshold and higher than the second threshold.

11. The method according to claim 1, wherein the preset first condition comprises the network status information of the first UE indicating that the first UE is unable to directly perform data transmission with the base station.

12. The method according to claim 1, wherein the preset first condition comprises the signal quality between the second UE and a base station being lower than the first threshold and higher than the second threshold.

13. The apparatus according to claim 4, wherein the preset first condition comprises the network status information of the UE indicating that the UE is unable to directly perform data transmission with the base station.

14. The apparatus according to claim 4, wherein the preset first condition comprises the signal quality between the apparatus and the base station being lower than the first threshold and higher than the second threshold.

* * * * *